(12) United States Patent
Furuichi

(10) Patent No.: US 10,873,861 B2
(45) Date of Patent: Dec. 22, 2020

(54) COMMUNICATION CONTROL DEVICE, COMMUNICATION CONTROL METHOD, AND WIRELESS COMMUNICATION DEVICE FOR FREQUENCY SHARING AMONG HIGH-PRIORITY WIRELESS NETWORKS

(71) Applicant: SONY CORPORATION, Tokyo (JP)

(72) Inventor: Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/068,928

(22) PCT Filed: Oct. 27, 2016

(86) PCT No.: PCT/JP2016/081951
§ 371 (c)(1),
(2) Date: Jul. 10, 2018

(87) PCT Pub. No.: WO2017/130494
PCT Pub. Date: Aug. 3, 2017

(65) Prior Publication Data
US 2019/0028900 A1  Jan. 24, 2019

(30) Foreign Application Priority Data

Jan. 27, 2016  (JP) ................... 2016-013282

(51) Int. Cl.
*H04W 72/00* (2009.01)
*H04W 4/00* (2018.01)
(Continued)

(52) U.S. Cl.
CPC .......... *H04W 16/14* (2013.01); *H04W 72/04* (2013.01); *H04W 72/0453* (2013.01); *H04W 72/10* (2013.01); *H04W 92/24* (2013.01)

(58) Field of Classification Search
CPC . H04W 16/14; H04W 72/04; H04W 72/0453; H04W 72/10; H04W 92/24
(Continued)

(56) References Cited

U.S. PATENT DOCUMENTS 9,860,898 B1 *  1/2018  Liu ................. H04L 5/0098
2001/0031634 A1 * 10/2001 Mizutani ........... H04W 72/10
455/425
(Continued)

FOREIGN PATENT DOCUMENTS

BR     112016028331 A2    8/2017
CN       101800999 A      8/2010
(Continued)

OTHER PUBLICATIONS

International Search Report and Written Opinion of PCT Application No. PCT/JP2016/081951, dated Jan. 17, 2017, 07 pages of English Translation and 07 pages of ISRWO.
(Continued)

*Primary Examiner* — Rafael Pérez-Gutiérrez
*Assistant Examiner* — Mark G. Pannell
(74) *Attorney, Agent, or Firm* — Chip Law Group

(57) ABSTRACT

A communication control device including a management unit configured to manage one or more first wireless communication device, and an information exchange unit configured to exchange, with another communication control device that manages one or more second wireless communication devices, information related to frequency sharing by the second wireless communication devices. The information related to frequency sharing includes information related to a frequency band in which high-priority access can be made.

19 Claims, 13 Drawing Sheets

(51) Int. Cl.
*H04W 16/14* (2009.01)
*H04W 72/04* (2009.01)
*H04W 92/24* (2009.01)
*H04W 72/10* (2009.01)

(58) Field of Classification Search
USPC .......................................................... 455/454
See application file for complete search history.

(56) References Cited

U.S. PATENT DOCUMENTS

| | | | |
|---|---|---|---|
| 2008/0032671 A1* | 2/2008 | Karabinis | H04B 7/18513 455/412.1 |
| 2011/0013571 A1 | 1/2011 | Sawai | |
| 2011/0077042 A1 | 3/2011 | Stanforth et al. | |
| 2012/0094681 A1 | 4/2012 | Freda et al. | |
| 2012/0182883 A1 | 7/2012 | Junell et al. | |
| 2012/0282942 A1* | 11/2012 | Uusitalo | H04W 16/14 455/452.2 |
| 2013/0294415 A1* | 11/2013 | Moilanen | H04W 16/14 370/331 |
| 2015/0018002 A1 | 1/2015 | Touag et al. | |
| 2015/0358968 A1 | 12/2015 | Malladi et al. | |
| 2016/0088487 A1 | 3/2016 | Yu et al. | |
| 2016/0088488 A1 | 3/2016 | Kang et al. | |
| 2016/0094999 A1 | 3/2016 | Yu et al. | |
| 2016/0105897 A1* | 4/2016 | Liu | H04W 72/1226 370/235 |
| 2016/0112879 A1 | 4/2016 | Horneman et al. | |
| 2016/0165596 A1 | 6/2016 | Touag et al. | |
| 2017/0289997 A1 | 10/2017 | Touag et al. | |

FOREIGN PATENT DOCUMENTS

| | | |
|---|---|---|
| CN | 103238361 A | 8/2013 |
| CN | 106465141 A | 2/2017 |
| EP | 2209333 A2 | 7/2010 |
| EP | 2818013 A2 | 12/2014 |
| EP | 2995108 A1 | 3/2016 |
| EP | 3152946 A1 | 4/2017 |
| ES | 2661912 T3 | 4/2018 |
| JP | 2010-187371 A | 8/2010 |
| JP | 2012-099954 A | 5/2012 |
| JP | 2013-506343 A | 2/2013 |
| JP | 2013-545365 A | 12/2013 |
| JP | 2017-517218 A | 6/2017 |
| KR | 10-2012-0091115 A | 8/2012 |
| KR | 10-2013-0118882 A | 10/2013 |
| KR | 10-2014-0134606 A | 11/2014 |
| KR | 10-2017-0015383 A | 2/2017 |
| TW | 201233219 A | 8/2012 |
| TW | 201349894 A | 12/2013 |
| WO | 2011/041052 A1 | 4/2011 |
| WO | 2012/051303 A1 | 4/2012 |
| WO | 2012/095555 A1 | 7/2012 |
| WO | 2013/126843 A2 | 8/2013 |
| WO | 2014/180507 A1 | 11/2014 |
| WO | 2014/180513 A1 | 11/2014 |
| WO | 2014/180514 A1 | 11/2014 |
| WO | 2015/187282 A1 | 12/2015 |

OTHER PUBLICATIONS

International Preliminary Report on Patentability of PCT Application No. PCT/JP2016/081951, dated Dec. 27, 2016, 04 pages of English Translation and 03 pages of IPRP.

Extended European Search Report of EP Patent Application No. 16888079.7, dated Dec. 17, 2018, 11 pages.

* cited by examiner

COMMUNICATION CONTROL DEVICE, COMMUNICATION CONTROL METHOD, AND WIRELESS COMMUNICATION DEVICE FOR FREQUENCY SHARING AMONG HIGH-PRIORITY WIRELESS NETWORKS

CROSS REFERENCE TO RELATED APPLICATIONS

This application is a U.S. National Phase of International Patent Application No. PCT/JP2016/081951 filed on Oct. 27, 2016, which claims priority benefit of Japanese Patent Application No. JP 2016-013282 filed in the Japan Patent Office on Jan. 27, 2016. Each of the above-referenced applications is hereby incorporated herein by reference in its entirety.

TECHNICAL FIELD

The present disclosure relates to a communication control device, a communication control method, a program, and a wireless communication device.

BACKGROUND ART

Since a frequency resource is limited, technologies for achieving efficient utilization of the frequency resource are being studied in many places. For example, for the Spectrum Access System (SAS) scheduled to be introduced into the 3.5 GHz band in the United States, it is studied to provide three priorities and allocate a channel (that is, a frequency band) to each wireless network in accordance with the priority.

In addition, as an approach for achieving efficient utilization of the frequency resource, a mechanism for causing a frequency band allocated to a certain wireless network to be utilized by another wireless network is being studied. For example, a mechanism for opening, among frequency channels allocated to a TV broadcast system, a channel (also referred to as a TV white space) not utilized by the TV broadcast system depending on an area to another system for utilization is being studied. Such a mechanism is also referred to as frequency secondary utilization. In general, a system to which a frequency channel has been allocated by priority is called a primary system, and a system that secondarily utilizes the frequency channel is called a secondary system. For example, Patent Literatures below disclose technologies related to frequency secondary utilization.

CITATION LIST

Patent Literature

Patent Literature 1: JP 2012-109922A
Patent Literature 2: JP 2012-213071A

DISCLOSURE OF INVENTION

Technical Problem

However, in the study of frequency secondary utilization, a high-priority wireless network that can utilize an allocated frequency band by priority is merely assumed to utilize the frequency band allocated to the high-priority wireless network itself. Therefore, it is not assumed that the high-priority wireless network, for example, shares a frequency band allocated to another high-priority system. To achieve more efficient utilization of the frequency resource, it is desirable that a mechanism in which an allocated frequency can be shared among such high-priority wireless networks is provided.

Solution to Problem

According to the present disclosure, there is provided a communication control device including: a management unit configured to manage one or more first wireless communication devices; and an information exchange unit configured to exchange, with another communication control device that manages one or more second wireless communication devices, information related to frequency sharing by the second wireless communication devices. The information related to frequency sharing includes information related to a frequency band in which high-priority access can be made.

In addition, according to the present disclosure, there is provided a communication control method including: managing one or more first wireless communication devices by a processor; and with another communication control device that manages one or more second wireless communication devices, exchanging, by an information exchange unit, information related to frequency sharing by the second wireless communication devices. The information related to frequency sharing includes information related to a frequency band in which high-priority access can be made.

In addition, according to the present disclosure, there is provided a program for causing a computer to function as a communication control device including: a management unit configured to manage one or more first wireless communication devices; and an information exchange unit configured to exchange, with another communication control device that manages one or more second wireless communication devices, information related to frequency sharing by the second wireless communication devices. The information related to frequency sharing includes information related to a frequency band in which high-priority access can be made.

In addition, according to the present disclosure, there is provided a wireless communication device including: a processing unit configured to transmit a message requesting exchange of information for carrying out carrier aggregation through use of a frequency band provided by frequency sharing by another wireless communication device to a communication control device that manages the wireless communication device, the information being related to the frequency sharing between the communication control device and another communication control device that manages the other wireless communication device.

Advantageous Effects of Invention

According to the present disclosure as described above, a mechanism in which an allocated frequency can be shared among high-priority wireless networks is provided. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
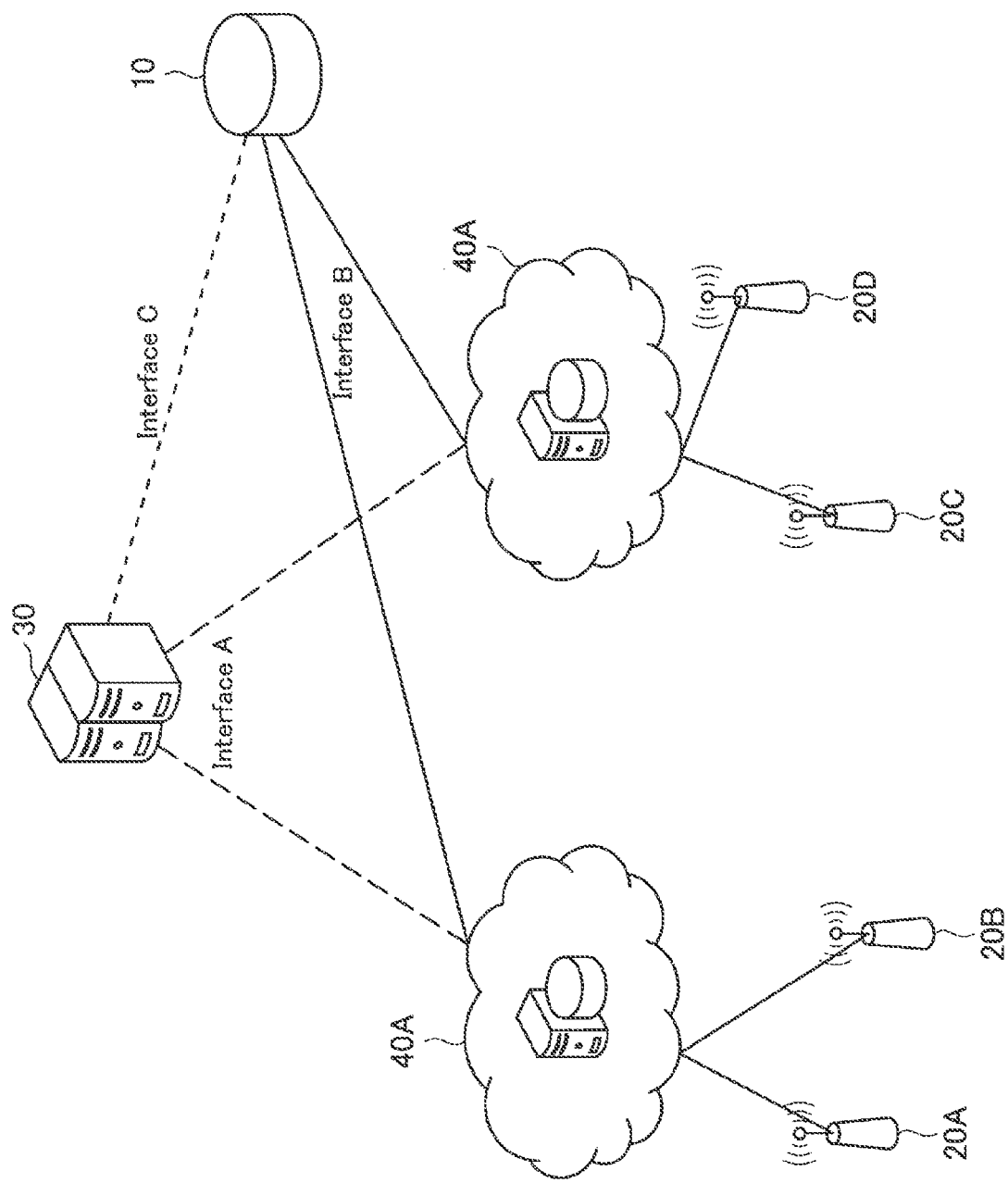
FIG. 1 is a drawing illustrating an example of an architecture for achieving transfer or lease of a PAL.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, in the present specification and drawings, elements that have substantially the same function and structure are distinguished in some cases by adding different alphabets after the same reference numerals. For example, a plurality of elements that have substantially the same function and structure are distinguished like network managers 100A, 100B, and 100C according to necessity. However, in a case where it is not particularly necessary to distinguish among a plurality of elements that have substantially the same function and structure, the same reference numerals are merely given. For example, in the case where it is not particularly necessary to distinguish among the network managers 100A, 100B, and 100C, they are simply referred to as a network manager 100.

Note that description will be provided in the following order.

1. Introduction 1.1. License 1.2. SAS 1.3. Technological problems 1.4. Overview of new architecture 1.5. Assumed scenario 2. Configuration examples 2.1. Configuration example of system 2.2. Configuration example of network manager 2.3. Configuration example of base station 3. Respective embodiments 3.1. First embodiment 3.2. Second embodiment 3.3. Third embodiment 3.4. Fourth embodiment 4. Application examples 5. Conclusion

1. INTRODUCTION

<1.1. License>

In general, the license for frequency utilization is granted by a frequency management authority or the like of each country. An example of license forms is shown in Table 1 below.

TABLE 1

| Individual Authorisation (Individual rights of use) | | | |
| --- | --- | --- | --- |
| Individual Licence (Traditional licensing) | | General Authorisation (No individual rights of use) | |
| | Light-Licensing | | Licence-exempt |
| Individual frequency planning/coordination Traditional Procedure for issuing licences | Individual frequency planning/coordination Simplified procedure compared to traditional procedure | No individual frequency planning/coordination Registration and/or notification. | No individual frequency planning/coordination No registration and/or notification. |

TABLE 1-continued

| Individual Authorisation (Individual rights of use) | | General Authorisation (No individual rights of use) |
| --- | --- | --- |
| Individual Licence (Traditional licensing) | Light-Licensing | Licence-exempt |
| | for issuing licences. With limitations in the number of users | No limitations in the number of users nor need for coordination. |

Table 1 above is described in "CEPT, "ECC Report 132: Light Licensing, License-Exempt and Commons", Moscow, June, 2009." <URL: http://www.erodocdb.dk/docs/doc98/official/Pdf/ECCRep132.pdf>. The "Individual Licence" is a mechanism generally called "Licensed", and grant of a license is required. For example, a primary system is granted a license in accordance with this mechanism. For example, this mechanism is applied to mobile network operators, broadcasters, and the like. On the other hand, the "Licence-Exempt" is a mechanism generally called "Unlicensed", and grant of a license is not required. For example, a typical wireless local area network (WLAN) device, a Bluetooth (registered trademark) device, and the like are used in this mechanism. The "Light-licensing" is typically a mechanism in which a non-exclusive license is granted.

<1.2. SAS>

The SAS is a technology scheduled to be introduced into the 3.5 GHz band in the United States. In the SAS, a spectrum access layer of a three-tier structure is defined. In detail, "Incumbent Access Tier", "Priority Access Tier", and "General Authorized Access Tier" are defined in descending order of priorities. A wireless network in the "Incumbent Access Tier" can utilize an exclusively available frequency. A wireless network in the "Priority Access Tier" can utilize a temporarily exclusively available frequency. A wireless network in the "General Authorized Access Tier" can utilize a frequency which is non-exclusive, that is, a frequency for which interference protection is not ensured.

The "Priority Access Tier" is equivalent to "Light licensing" of "Individual authorization" in Table 1 above. A wireless network in the "Priority Access Tier" is granted a Priority Access License (PAL), and can utilize a PAL channel. Note that the PAL channels are frequency channels on a 10-MHz basis. In addition, seven channels are reserved as the PAL channels for each predetermined geographical range (for example, census tract), and up to four successive PAL channels can be utilized per user (licensee).

Here, transfer or lease of a PAL is being studied in the Federal Communications Commission (FCC). In order to achieve transfer or lease of a PAL, an architecture shown in FIG. 1, for example, is conceivable.

FIG. 1 is a drawing illustrating an example of an architecture for achieving transfer or lease of a PAL. As shown in FIG. 1, the present architecture includes a spectrum broker 10, eNBs (eNodeBs) 20A to 20D, a SAS database 30, and core networks 40A and 40B. The SAS database 30 manages which system utilizes which frequency band with which priority (that is, spectrum access layer). The eNBs 20A and 20B are controlled by the core network 40A. The eNBs 20C and 20D are controlled by the core network 40B. Each of the core networks 40 controls the subordinate eNB 20 to utilize a frequency band allocated to the core network 40 itself registered in the SAS database 30. The core networks 40A and 40B are typically operated by different business operators. The spectrum broker 10 mediates transfer or lease of a frequency between the respective core networks 40.

An interface between the core network 40 and the SAS database 30 is also referred to as an interface A. Each core network 40 acquires information related to a frequency opened for secondary utilization utilizing the interface A to perform frequency secondary utilization.

An interface between the core network 40 and the spectrum broker 10 is also referred to as an interface B. An interface between the spectrum broker 10 and the SAS database is also referred to as an interface C. The spectrum broker 10 mediates transfer or lease of a frequency between the respective core networks 40 utilizing the interface B and the interface C.

<1.3. Technological Problems>

However, it is difficult to introduce the above-described architecture into the framework of the SAS. This difficulty will be described with reference to FIG. 2.

Figure 2:
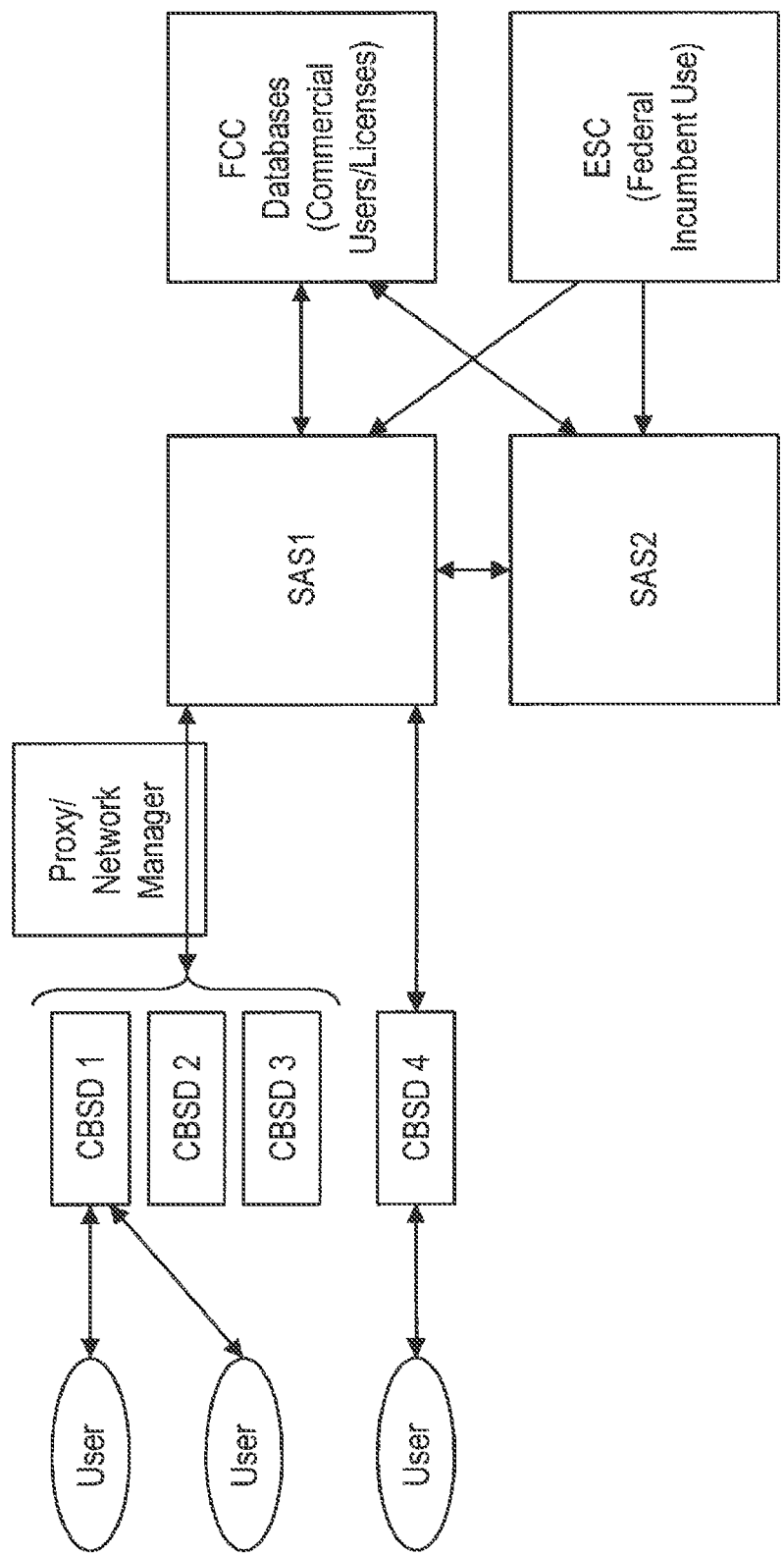
FIG. 2 is a drawing illustrating an architecture of an existing SAS.

FIG. 2 is a drawing illustrating an architecture of an existing SAS. As shown in FIG. 2, the architecture of the SAS includes "User", "Citizens Broadband Radio Service Devices (CBSD)", "Proxy/Network Manager", "SAS", "FCC Databases", and "Environmental Sensing Capability (ESC)". Numbers added to these structural elements are indices for distinguishing among them. The "User" is an end user of a wireless service, and typically user equipment (UE) such as a smartphone. The "CBSD" is a device that provides the "User" with a wireless service, and is equivalent to the eNB 20 shown in FIG. 1. The "SAS" is an entity equivalent to the SAS database 30 shown in FIG. 1, and cooperation between the "SASs" is possible. The "Proxy/Network Manager" is an entity that mediates an interaction between the "SAS" and the "CBSD", and is equivalent to the spectrum broker 10 shown in FIG. 1. The "FCC Databases" are entities that manage information related to the licenses of respective frequency bands or information related to systems belonging to the "Incumbent Access Tier". The "ESC" is an entity that senses a signal of a system belonging to the "Incumbent Access Tier".

For example, a "CBSD1" to a "CBSD3" and a "User" who enjoys wireless services provided by them and a "CBSD4" and a "User" who enjoys a wireless service provided by the "CBSD4" form wireless networks different from each other. In order to achieve transfer or lease of a frequency between these wireless networks, it is desirable that the interface B shown in FIG. 1 is provided for each wireless network, and that an interaction between the respective wireless networks via the spectrum broker 10 is possible. In other words with regard to the architecture shown in FIG. 2, it is desirable that the "Proxy/Network Manager" is provided for each wireless network, and that an interaction between the "Proxy/Network Managers" is possible. However, in the existing SAS architecture, the "Proxy/Network Manager" is not necessarily provided for each wireless network, and an interaction between the "Proxy/Network Managers" is not defined. Further, the function of the "Proxy/Network Manager" is not defined at all, and standards do not exist as a matter of course. Therefore, the "Proxy/Network Manager" is mounted uniquely by a communication business operator, for example. Under such circumstances, it is difficult to achieve transfer or lease of a frequency in the existing SAS architecture.

<1.4. Overview of New Architecture>

Thus, one embodiment of the present disclosure discloses a SAS architecture that can achieve transfer or lease of a frequency. The present architecture will be described with reference to FIG. 3.

Figure 3:
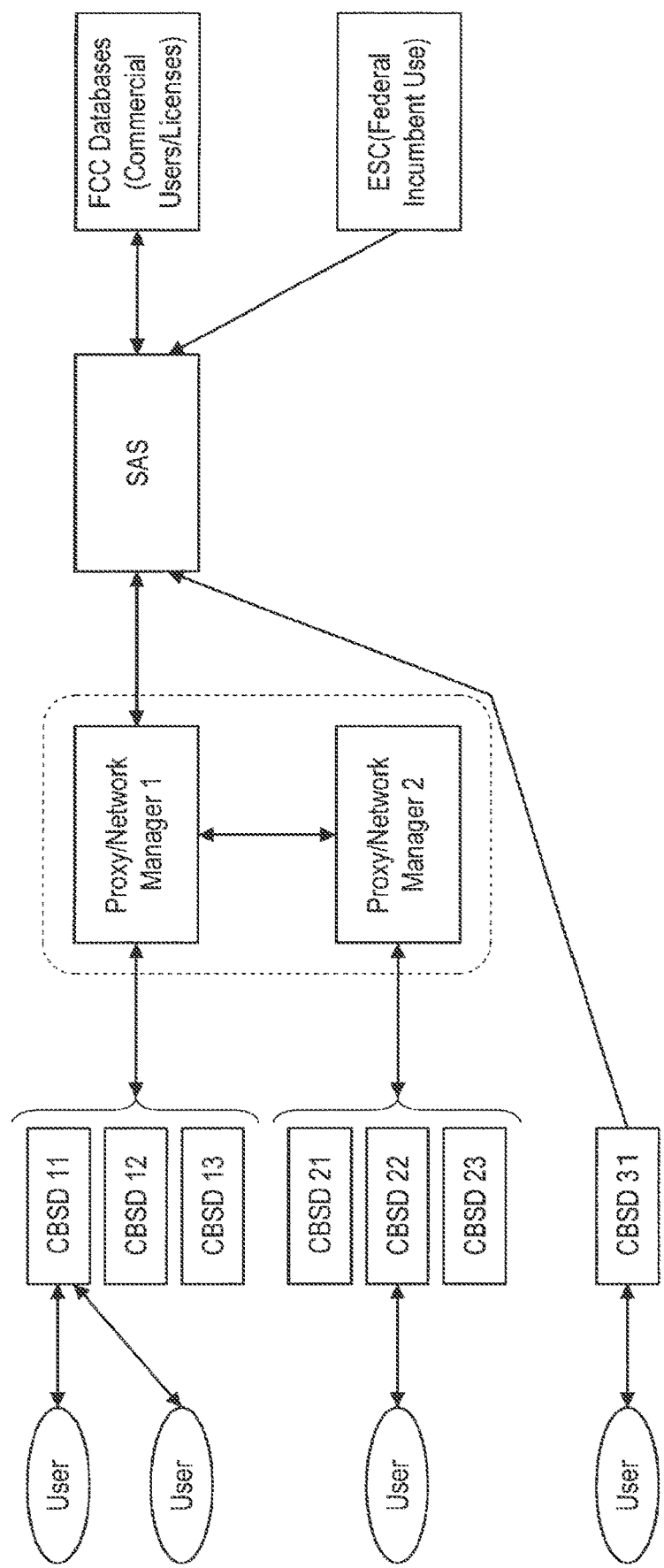
FIG. 3 is a drawing illustrating an example of an architecture of a SAS according to the embodiment.

FIG. 3 is a drawing illustrating an example of a SAS architecture according to the present embodiment. As shown in FIG. 3, in the SAS architecture according to the present embodiment, each of wireless networks is provided with the "Proxy/Network Manager", and an interface that enables an interaction between the "Proxy/Network Managers" is provided. Note that, as a "CBSD31" not provided with the "Proxy/Network Manager", an access point of a wireless local area network (LAN) system that utilizes a frequency in the "General Authorized Access Tier", for example, or the like is assumed.

Note that an extension of the existing SAS architecture has been described above as a new architecture, whilst the present technology is not limited to such an example. For example, the present technology is also applicable to a coexistence technology between similar or dissimilar networks (P802.19.1a) in the frequency band lower than or equal to 6 GHz including TV white spaces, which is being studied in the IEEE 802.19 Task Group 1a (TG1a). A coexistence manager (CM) equivalent to the "Proxy/Network Manager" in IEEE Std 802.19.1™-2014 which is the standard on which P802.19.1a is based does not perform transfer or lease of a frequency to another CM, and does not have an interface for interaction. Therefore, the present technology is also applicable to IEEE P802.19.1a.

<1.5. Assumed Scenario>

Figure 4:
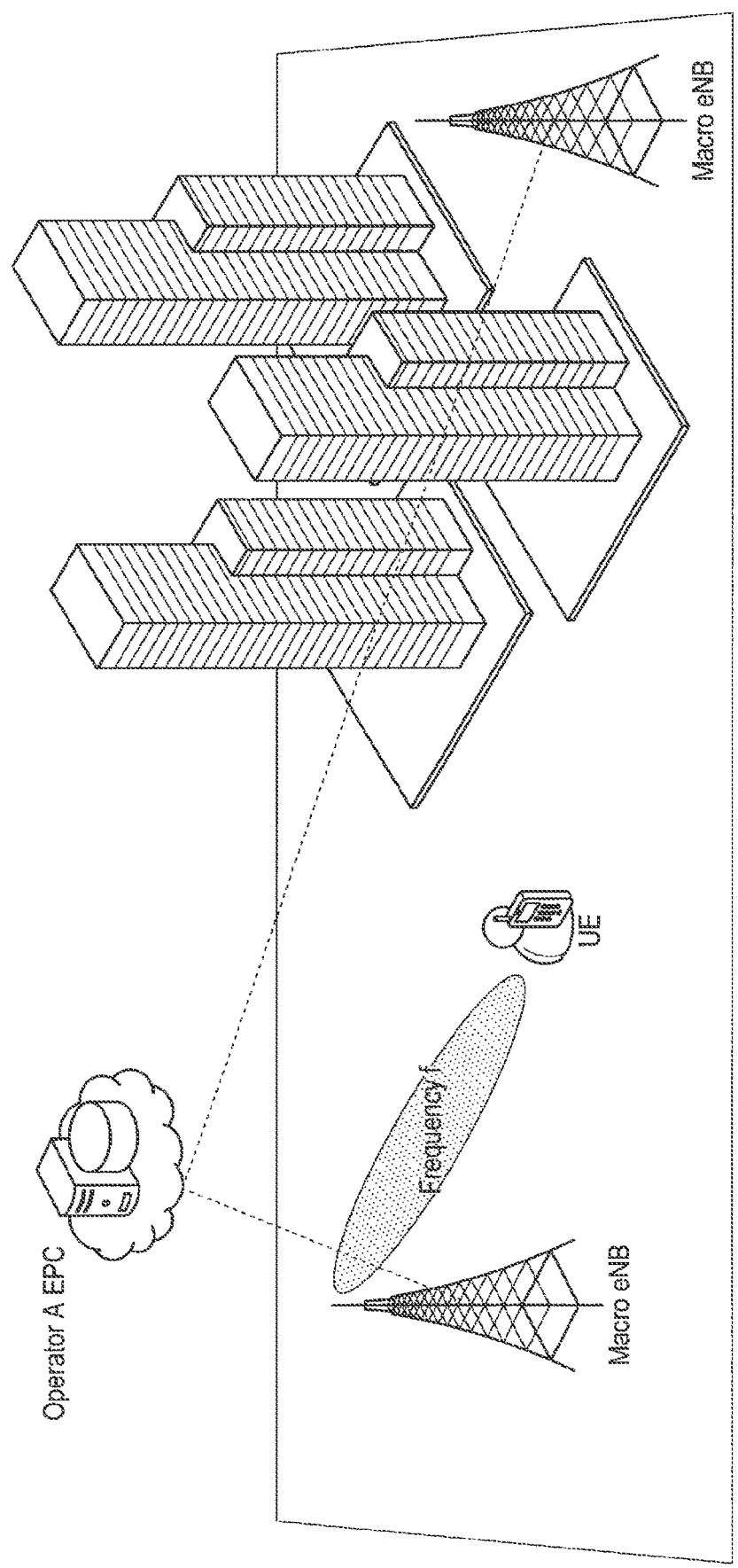
FIG. 4 is an explanatory diagram for specifically describing a scenario in which introduction of the architecture according to the embodiment is assumed.
Figure 5:
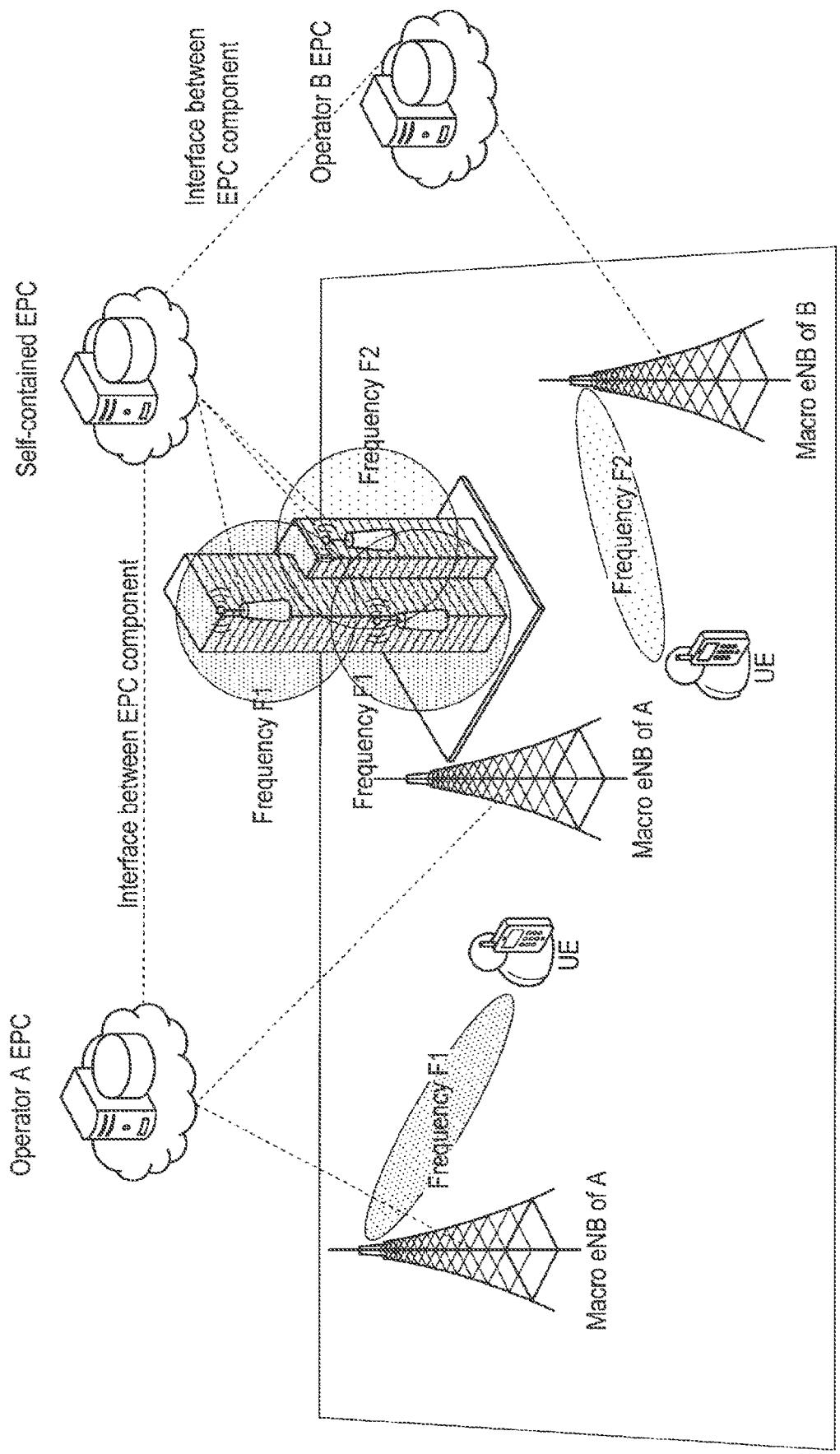
FIG. 5 is an explanatory diagram for specifically describing a scenario in which introduction of the architecture according to the embodiment is assumed.

Hereinafter, an example of a scenario in which application of the above-described new architecture is assumed will be described with reference to FIG. 4 and FIG. 5. FIG. 4 and FIG. 5 are explanatory diagrams for specifically describing a scenario in which introduction of the above-described new architecture is assumed.

In general, a mobile network operator (MNO) has permission for a certain frequency f. Then, the MNO provides a wireless service through use of the frequency f for user equipment (UE) that a subscriber possesses, while controlling a network utilizing a packet control network such as the Evolved Packet Core (EPC), as shown in FIG. 4.

It is important for the MNO to make it possible to ensure network connection of UE everywhere, that is, to expand coverage of a network densely and widely. Therefore, since external radio waves are unlikely to reach into a construction such as a building or condominium, it is desirable to install an antenna inside. However, in order to install an antenna inside the construction, a negotiation with the owner of the construction, network planning in accordance with the construction, the installation cost, and the like are required, which impose a heavy burden on the MNO.

An example of a method of lessening such a burden includes introduction of a low-cost Wi-Fi (registered trademark) system. However, users do not utilize the Wi-Fi system in many cases since complicated user manipulations, such as input of a password and a procedure for consent to terms of service, are required in order to utilize the Wi-Fi system. Therefore, it is difficult to say that such a burden lessening method is an effective method.

In addition, in the case where the construction is a commercial facility, an accommodation, or the like, for example, the Wi-Fi system may be introduced by an owner, a tenant, an operating company, or the like of the construction, for example, other than the MNO. However, similarly in this case, users do not utilize the Wi-Fi system in many cases since complicated user manipulations, such as input of a password, input of credit card information, and a procedure for consent to terms of service, are required in order to utilize the Wi-Fi system. Therefore, it is difficult for the owner, the tenant, the operating company, or the like of the construction to draw users in its own network from a cellular network, and it is difficult to sufficiently collect the service charge of the Wi-Fi system.

On the other hand, users often do not permit the above-described low usability while demanding inexpensive and seamless network coverage. Therefore, users may endure an unstable but already charged MNO network or the like, without utilizing a stable Wi-Fi service deliberately with new charging in a specific area such as the inside of a construction while subscribing to an expensive MNO network.

Consequently, in the above-described scenario, it is desirable to satisfy requests of the above-described three parties. First, for the MNO, reduction of the frequency procurement cost, operating expense (OPEX), or capital expenditure (CAPEX) is desirable. For the owner of a specific area (such as a commercial facility or an accommodation) or the like, it is desirable to smoothly draw users in a uniquely installed wireless network, so that more service charges can be collected. For users, it is desirable to obtain inexpensive, seamless, and stable network connectivity.

In such a scenario, application of the present technology is effective. Specifically, as shown in FIG. 5, when a cellular system transfers or leases the frequency f allocated to the cellular system itself to a wireless network that provides a wireless service in a specific area, it is possible to satisfy the requests of the above-described three parties.

In FIG. 5, a cellular system operated in a specific area is shown in addition to a cellular system operated by an operator A and a cellular system operated by an operator B. The cellular system operated by the operator A includes an EPC and a macro eNB, and provides a wireless service for UE exclusively using a frequency F1 allocated to the cellular system itself. Similarly, the cellular system operated by the operator B includes an EPC and a macro eNB, and provides a wireless service for UE exclusively using a frequency F2 allocated to the cellular system itself. The cellular system operated in a specific area is a system operated by an owner of the specific area or the like including a self-contained EPC and a base station (typically, a small cell base station). Then, the cellular system operated in the specific area has an interface with another cellular system, and provides a wireless service exclusively using the frequency F1 or F2 transferred or leased from the operator A or B. Accordingly, the above-described requests of the three parties are satisfied as will be described below.

First, the owner of the specific area or the like will be described. It is possible for the owner of the specific area or the like to uniquely expand a wireless service and a network of better quality than Wi-Fi or the like. In addition, since the cellular system operated in the specific area is limited in provision area of the wireless service, a large-scale system such as the MNO is not required, and it is possible to reduce the capital investment cost. In addition, by utilizing an Authentication/Authorization/Accounting (AAA) entity included in the self-contained EPC, it is possible to easily carry out accounting, authentication, and the like. In addition, since the cellular system operated in the specific area is a wireless network similar to the cellular system of the MNO, it is possible to draw UE seamlessly.

Subsequently, the MNO will be described. Since it is possible for the MNO to provide a wireless service for users of the MNO itself utilizing a frequency band allocated to another MNO depending on a method of collaboration with the owner of the specific area or the like, it is possible to reduce the frequency procurement cost. In addition, different network planning or the like for each specific area is not required for the MNO, and it is possible to reduce the CAPEX. These allow the MNO to reduce the bit cost.

Subsequently, a user will be described. It is possible for the user to obtain network connectivity at low cost because of the reduction of bit cost. In addition, it is possible for the user to seamlessly transition between networks.

An example of the scenario in which application of the new architecture is assumed has been described above. Hereinafter, the new architecture will be specifically described.

2. CONFIGURATION EXAMPLE

First, a configuration example of a system and each device that are common among respective embodiments will be described with reference to FIG. 6 to FIG. 8.

<2.1. Configuration Example of System>

Figure 6:
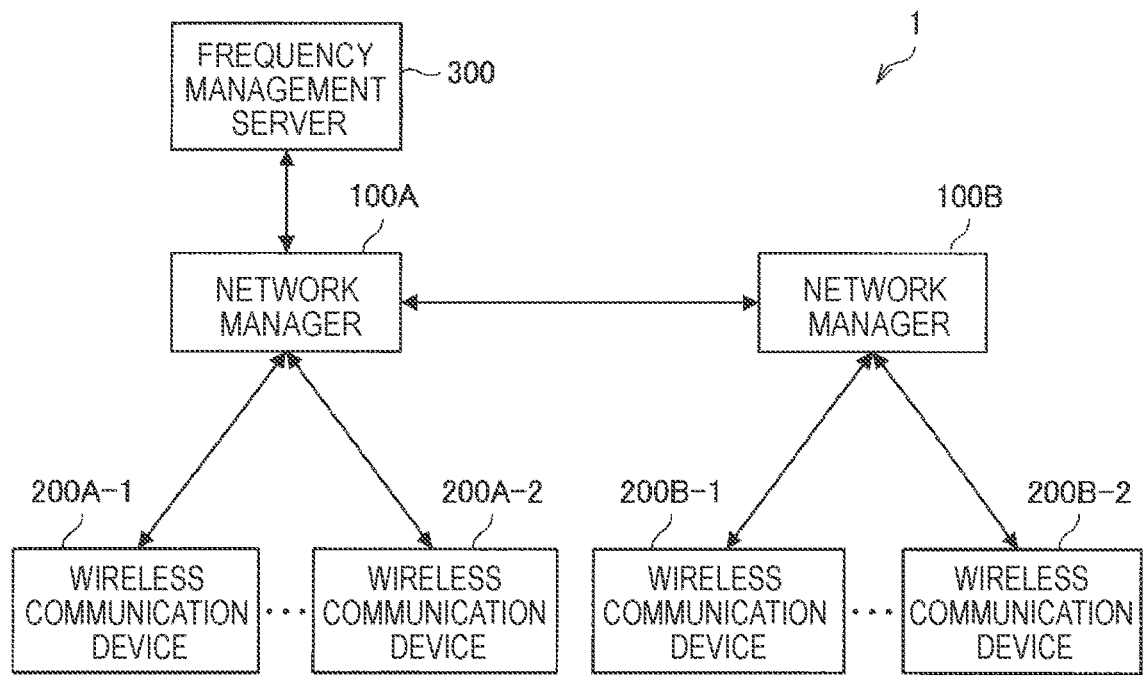
FIG. 6 is a drawing illustrating an example of a configuration of a system according to the embodiment.

FIG. 6 is a drawing illustrating an example of a configuration of a system 1 according to the present embodiment. As shown in FIG. 6, the system 1 according to the present embodiment includes network managers 100A, 100B, wireless communication devices 200A-1 to 200A-2, 200B-1 to 200B-2, and a frequency management server 300.

(1) Frequency Management Server 300

The frequency management server 300 is a device that manages information related to a frequency utilized by each wireless network by priority. The frequency management server 300 is equivalent to an entity such as a geo-location database or a SAS database, for example. Note that the frequency management server 300 is equivalent to a frequency management device.

(2) Wireless Communication Device 200

The wireless communication device 200 is a device that provides a wireless service for subordinate user equipment on the basis of the control by the network manager 100. The wireless communication device 200 is typically a base station such as an eNB, an access point, or the like. The base station 200 and subordinate user equipment form a wireless system.

(3) Network Manager 100

The network manager 100 is an entity that controls a wireless network including a plurality of wireless systems. The network manager 100 may be equivalent to "Coexistence manager" in IEEE802.19.1, "Spectrum coordinator" in ETSI EN 303 387, "Proxy/Network manager" in the SAS architecture, operations, administration, and management (OAM) in a cellular network, or a central control device that each business operator possesses uniquely, for example.

The network manager 100 has the function of negotiating with the frequency management server 300 to acquire a high-priority access right. Then, the network manager 100 causes a subordinate wireless system to exercise the high-priority access right to make high-priority access. Here, the high-priority access refers to utilizing a channel by priority (for example, exclusively). In addition, the high-priority access right is the right for high-priority access, and in other words, refers to the right (for example, a license) to utilize a channel with a high priority (for example, exclusively). In addition, exercising the high-priority access right refers to exercising the right to utilize a channel exclusively to utilize the channel. That is, it is possible for the wireless system to make high-priority access, not only by acquiring the high-priority access right, but only after exercising the high-priority access right. This is associated with matters scheduled to be defined in the SAS. In detail, in the case of the SAS, only the high-priority access right (that is, PAL) is initially granted to a wireless network. Then, it is expected that a specific channel is allocated to the wireless network only after the wireless network requests allocation of a high-priority channel from a frequency management server on the basis of the high-priority access right, and it is possible to make high-priority access in the channel.

In addition, the network manager 100 has the function of representing negotiation with the frequency management server 300 by another network manager 100. For example, the network manager 100A negotiates with the frequency management server 300 as a proxy for the network manager 100B not having an interface with the frequency management server 300.

Here, typically, the network manager 100A and the network manager 100B are operated by different business operators (or managers). As a matter of course, the network manager 100A and the network manager 100B may be operated by an identical business operator (or manager).

In addition, an identical business operator may operate a plurality of network managers 100. In that case, typically, a geographical range targeted for management (specifically, a geographical range in which the base station 200 targeted for control exists) may differ among the network managers 100 operated by an identical business operator. On the other hand, the geographical ranges targeted for management may overlap between the network managers 100 operated by different business operators. Hereinafter, a geographical range targeted for management is simply referred to as a management region as well. Note that the management region may correspond to a census tract, for example.

Note that the base stations 200A-1 to 200A-2 managed by the network manager 100A will be collectively referred to as a base station 200A as well. Similarly, the base stations 200B-1 to 200B-2 managed by the network manager 100B will be collectively referred to as a base station 200B as well. The network manager 100A is equivalent to a communication control device, the network manager 100B is equivalent to another communication control device, the base station 200A is equivalent to a first wireless communication device, and the base station 200B is equivalent to a second wireless communication device.

(4) Supplement

In the present specification, the priority shall stand for a channel utilization priority. For example, channel priorities in the 3.5 GHz band in the United States are described in descending order of priorities as "Priority access license (PAL) channel">"Reserved channel">"general authorized access (GAA) channel". In addition, the priority may stand for the type of authorization related to frequency band utilization shown in Table 1, for example. The types of authorization related to frequency band utilization are described in descending order of priorities as "Individual authorization" of "Traditional licensing">"Individual authorization" of "Light-licensing">"General authorization" of "Light-licensing">"General authorization" of "License-exempt". In addition, the priority may stand for the type of wireless system included in a wireless network targeted for management of the network manager 100. The types of wireless system are described in descending order of priorities as "Public safety (Mission critical)">"Public safety">"General use (Mission critical)">"General use". In addition, the priority may stand for the proportion that serves the above-described wireless system in the network manager 100. In addition, the priority may stand for the magnitude of an incentive for which a representative procedure is to be performed. In addition, the priority may stand for the level of a priority of allocated QoS.

In addition, in the present specification, a frequency band shared between a plurality of different wireless networks is also referred to as a shared frequency band. The shared frequency band not only includes bands in which frequency sharing is currently carried out or scheduled to be carried out, such as the TV band, 2.3 GHz band, 2.4 GHz band, 3.55 GHz to 3.70 GHz in the United States, and 5 GHz band, for example, but also includes frequency bands in which frequency sharing will be carried out in the future.

<2.2. Configuration Example of Network Manager>

Figure 7:
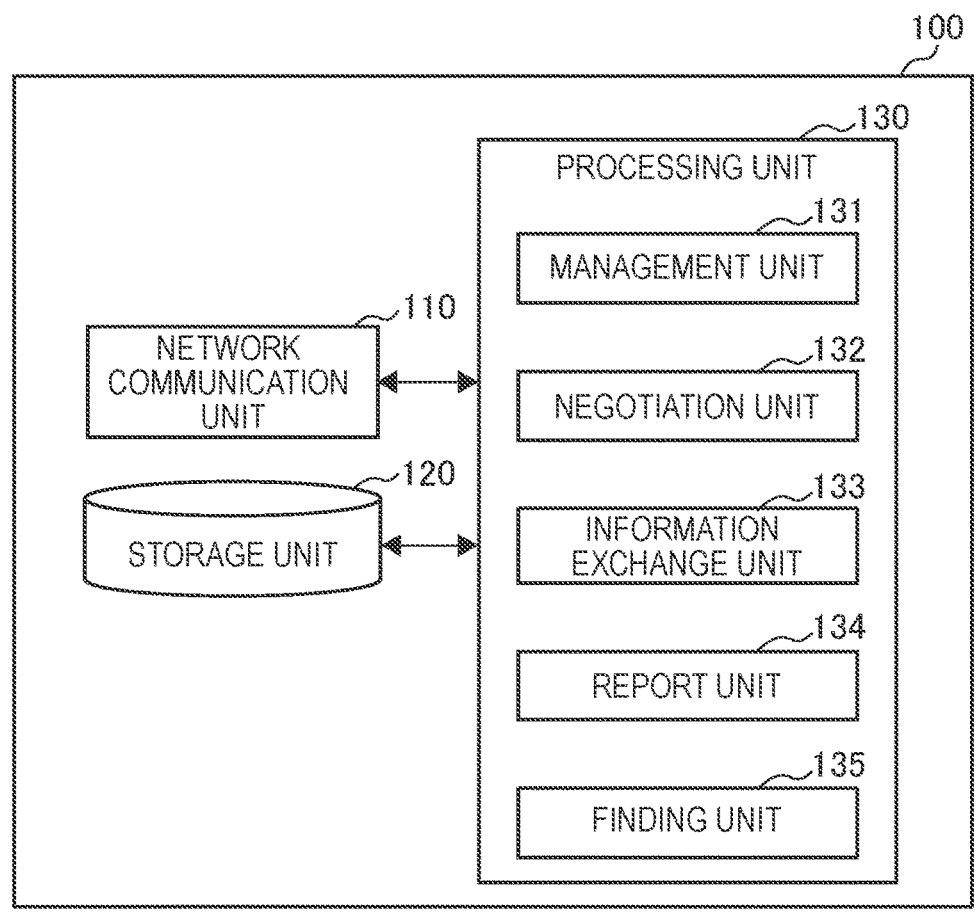
FIG. 7 is a block diagram illustrating an example of a configuration of a network manager according to the embodiment.

FIG. 7 is a block diagram illustrating an example of a configuration of the network manager 100 according to the present embodiment. As shown in FIG. 7, the network manager 100 includes a network communication unit 110, a storage unit 120, and a processing unit 130.

(1) Network Communication Unit 110

The network communication unit 110 transmits/receives information. For example, the network communication unit 110 transmits information to another node, and receives information from another node. For example, the above-described other node includes another network manager 100, a subordinate base station 200, and the frequency management server 300.

(2) Storage Unit 120

The storage unit 120 temporarily or permanently stores a program and various types of data for the operation of the network manager 100.

(3) Processing Unit 130

The processing unit 130 provides various functions of the network manager 100. The processing unit 130 includes a management unit 131, a negotiation unit 132, an information exchange unit 133, a report unit 134, and a finding unit 135. Note that the processing unit 130 may further include other structural elements other than these structural elements. That is, the processing unit 130 may also perform operations other than the operations of these structural elements.

The functions of the management unit 131, the negotiation unit 132, the information exchange unit 133, the report unit 134, and the finding unit 135 will be described later in detail.

<2.3. Configuration Example of Base Station>

Figure 8:
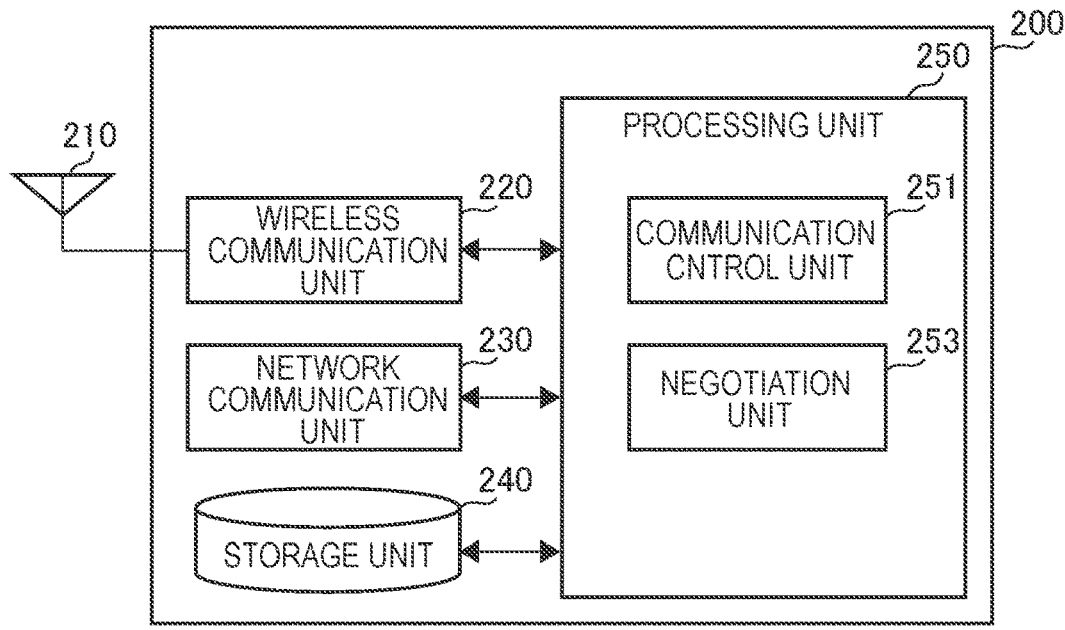
FIG. 8 is a block diagram illustrating an example of a configuration of a base station according to the embodiment.

FIG. 8 is a block diagram illustrating an example of a configuration of the base station 200 according to the present embodiment. With reference to FIG. 8, the base station 200 includes an antenna unit 210, a wireless communication unit 220, a network communication unit 230, a storage unit 240, and a processing unit 250.

(1) Antenna Unit 210

The antenna unit 210 emits a signal output from the wireless communication unit 220 into space as a radio wave. In addition, the antenna unit 210 converts a radio wave in space into a signal, and outputs the signal to the wireless communication unit 220.

(2) Wireless Communication Unit 220

The wireless communication unit 220 transmits/receives signals. For example, the wireless communication unit 220 transmits a downlink signal to user equipment, and receives an uplink signal from user equipment.

(3) Network Communication Unit 230

The network communication unit 230 transmits/receives information. For example, the network communication unit 230 transmits information to another node, and receives information from another node. For example, the above-described other node includes another base station 200, a core network node, and the network manager 100 that manages the base station 200 itself.

(4) Storage Unit 240

The storage unit 240 temporarily or permanently stores a program and various types of data for the operation of the base station 200.

(5) Processing Unit 250

The processing unit 250 provides various functions of the base station 200. The processing unit 250 includes a communication control unit 251 and a negotiation unit 253. Note that the processing unit 250 may further include other structural elements other than these structural elements. That is, the processing unit 250 may also perform operations other than the operations of these structural elements.

The functions of the communication control unit 251 and the negotiation unit 253 will be described later in detail.

3. RESPECTIVE EMBODIMENTS

Hereinafter, respective embodiments will be described in detail.

3.1. First Embodiment

The present embodiment is an embodiment in which the network manager 100A performs a procedure related to utilization of a shared frequency band occurring with the frequency management server 300 as a proxy for the network manager 100B.

(Technological Characteristics)

The network manager 100 (for example, the management unit 131) manages one or more base stations 200. For example, the network manager 100 controls a frequency band to be utilized by one or more subordinate wireless systems (that is, the base station 200 and user equipment). A wireless system including the base station 200A targeted for management of the network manager 100A will hereinafter be referred to as a first wireless system as well. In addition, a wireless system including the base station 200B targeted for management of the network manager 100B will hereinafter be referred to as a second wireless system as well.

The network manager 100A (for example, the negotiation unit 132) has the function of negotiating with the frequency management server 300 with regard to utilization of a shared frequency band. For example, the network manager 100A may perform a procedure of acquiring permission to utilize the shared frequency band. In addition, the network manager 100A may perform a procedure of acquiring the high-priority access right for the shared frequency band. These procedures typically require payment of compensation. In addition, the network manager 100A may perform a procedure of acquiring information related to the shared frequency band from the frequency management server 300.

In addition, the network manager 100A (for example, the negotiation unit 132) has the function of negotiating with the frequency management server 300 as a proxy for the network manager 100B. For example, the network manager 100A may represent the procedure of acquiring permission to utilize the shared frequency band. In addition, the network manager 100A may represent a procedure of acquiring the high-priority access right of the shared frequency band. In addition, the network manager 100A may represent a procedure of acquiring information related to the shared frequency band from the frequency management server 300.

Then, the network manager 100A (for example, the information exchange unit 133) exchanges information related to frequency sharing by the base station 200B with the network manager 100B. The information related to frequency sharing indicates the whole information exchanged between the network manager 100A and the network manager 100B with regard to utilization of the shared frequency band by the base station 200B.

Above all, information related to frequency sharing according to the present embodiment includes information acquired by the network manager 100A from the frequency management server 300 as a proxy for the network manager 100B. Hereinafter, the information related to frequency sharing according to the present embodiment will be specifically described.

For example, the information related to frequency sharing may include information related to a frequency band in which high-priority access can be made. Specifically, the information related to frequency sharing may include information indicating a priority of each channel.

In addition, the information related to frequency sharing may include information for utilizing a frequency band in which high-priority access can be made. Specifically, the information related to frequency sharing may include a validity period of channel information, channel utilization condition, and the like.

In addition, the information related to frequency sharing may include information related to the high-priority access right. Specifically, the information related to frequency sharing may include information indicating which wireless network is granted the high-priority access right, information related to a frequency band for which the high-priority access right has been acquired, information related to a frequency band for which the high-priority access right has already been exercised, and the like. Note that the high-priority access right herein may be the right acquired for the base station 200A, may be the right acquired for the base station 200B by proxy, or may be the right acquired by another network manager 100.

In addition, the information related to frequency sharing may include information related to protection of a user of a high-priority frequency band. Specifically, the information related to frequency sharing may include positional information of a user (the base station 200 or user equipment) of a high-priority channel, information indicating a utilized channel, information indicating the maximum transmission power, and the like.

In addition, the information related to frequency sharing may include information related to frequency utilization informed by the frequency management server 300. Specifically, the information related to frequency sharing may include information related to update of an available channel list, and the like.

These pieces of information related to frequency sharing may be associated with a geographical range (for example, a management region). That is, the information related to frequency sharing may be information about each management region.

(Flow of Processing)

Hereinafter, a flow of processing for the network manager 100B to acquire information related to frequency sharing will be described with reference to FIG. 9 and FIG. 10.

Figure 9:
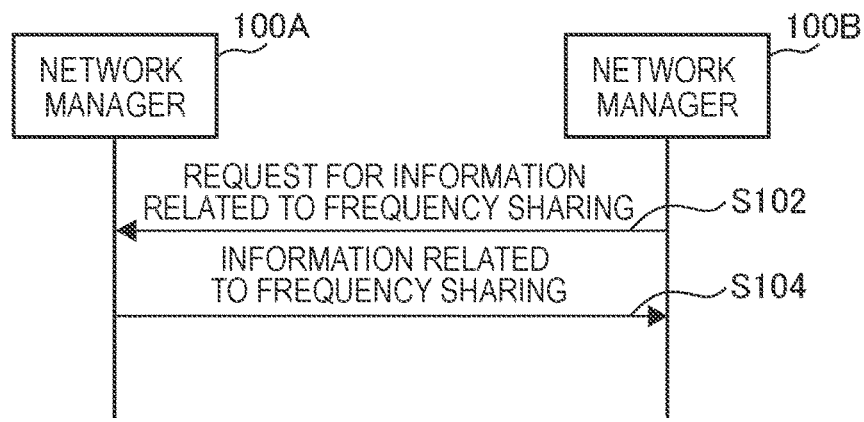
FIG. 9 is a sequence diagram illustrating an example of a flow of processing of acquiring information related to frequency sharing executed in a system according to a first embodiment.

FIG. 9 is a sequence diagram illustrating an example of a flow of processing of acquiring information related to frequency sharing executed in the system 1 according to the present embodiment. As shown in FIG. 9, first, the network manager 100B transmits a request for information related to frequency sharing to the network manager 100A (step S102). Then, the network manager 100A sends back the requested information related to frequency sharing to the network manager 100B (step S104). Note that the network manager 100A may negotiate with the frequency management server 300 prior to reply to acquire information related to frequency sharing. Accordingly, the process ends.

Figure 10:
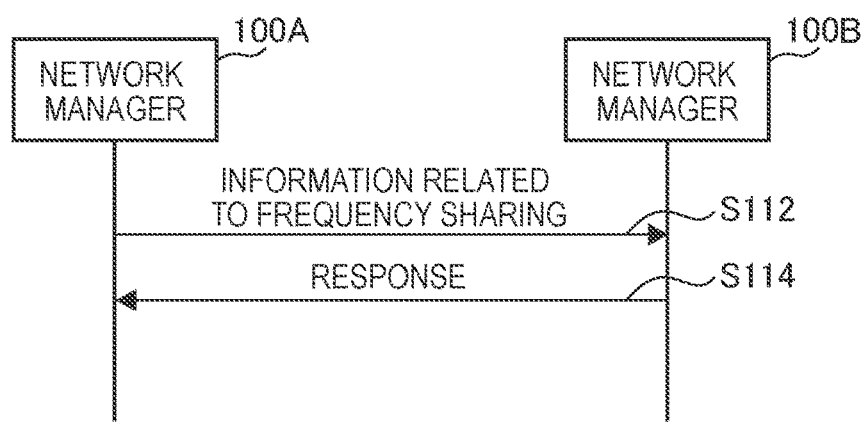
FIG. 10 is a sequence diagram illustrating an example of a flow of processing of acquiring information related to frequency sharing executed in a system according to the first embodiment.

FIG. 10 is a sequence diagram illustrating an example of a flow of processing of acquiring information related to frequency sharing executed in the system 1 according to the present embodiment. As shown in FIG. 10, first, the network manager 100A transmits information related to frequency sharing to the network manager 100B (step S112). Note that the network manager 100A may negotiate with the frequency management server 300 prior to transmission to acquire information related to frequency sharing. Then, the network manager 100B transmits a response related to the receipt of the information related to frequency sharing to the network manager 100A (step S114). Accordingly, the process ends.

Application Example

According to the present embodiment, it is possible for the network manager 100B not having connectivity to the frequency management server 300 to acquire information related to frequency sharing acquired by the network manager 100A by proxy. In addition, it is possible for the network manager 100B not having connectivity to the frequency management server 300 to acquire the high-priority access right acquired by the network manager 100A by proxy, and to cause the subordinate base station 200B to exercise the high-priority access right. In addition, it is possible for the network manager 100A and the network manager 100B to carry out coexisting control of mutual subordinate wireless systems by exchanging information related to the subordinate wireless systems.

3.2. Second Embodiment

The present embodiment is an embodiment in which a high-priority access right is transferred or leased between different wireless networks. Note that transfer shall be a concept including selling.

(Technological Characteristics)

The network manager 100A (for example, the negotiation unit 132) acquires a high-priority access right from the frequency management server 300. A frequency band for which the high-priority access right acquired by the network manager 100A has been exercised may be typically utilized by the base station 200A. However, above all, in the present embodiment, a frequency band for which the high-priority access right acquired by the network manager 100A has been exercised may be utilized by the base station 200B. Therefore, the network manager 100A (for example, the negotiation unit 132) transfers or leases the acquired high-priority access right to the network manager 100B in accordance with a request from the network manager 100B. Note that the high-priority access right may be transferred or leased prior to exercise, or may be transferred or leased after exercise (that is, after a frequency band in which high-priority access can be made is defined).

A frequency band transferred or leased to and utilized by the base station 200B may be a frequency band whose rate of utilization by the base station 200A is low. For example, the case where a channel in which high-priority access can be made is identical in the management region of the network manager 100A and the management region of the network manager 100B is assumed. In this case, the network manager 100A transfers or leases the high-priority access right of the channel whose rate of utilization by the base station 200A is low to the network manager 100B. Accordingly, it is possible for the network manager 100B to resolve the shortage of the frequency resource. In addition, it is possible for the network manager 100A to prevent the high-priority access right obtained by the payment of compensation from being wasted, and additionally to reduce a loss because of the sales amount or rent. In addition, the frequency utilization efficiency of the whole system 1 is improved.

In addition, the frequency band transferred or leased to and utilized by the base station 200B may be a frequency band not utilized as a primary cell of carrier aggregation by the base station 200A. For example, the case where a channel in which high-priority access can be made is identical in the management region of the network manager 100A and the management region of the network manager 100B is assumed. In that case, the network manager 100A transfers or leases the high-priority access right of a channel not used for a primary cell (or primary component carrier) application of carrier aggregation to the network manager 100B. Limitation to a channel not used for the primary cell application is for preventing handovers within a network of a transfer origin or lease origin (that is, the wireless network including the base station 200A) from occurring explosively. By transferring or leasing the high-priority access right with such a restriction, the frequency utilization efficiency of the whole system 1 can be improved while suppressing a burden on the wireless network of the transfer origin or lease origin.

In addition, the frequency band transferred or leased to and utilized by the base station 200B may be a frequency band which overlaps between the management region of the network manager 100A and the management region of the network manager 100B and in which high-priority access can be made. For example, the case where channels in which high-priority access can be made partly overlap between the management region of the network manager 100A and the management region of the network manager 100B is assumed. In that case, the network manager 100A transfers or leases the high-priority access right for an overlapping channel to the network manager 100B. Accordingly, it is possible to prevent a difference in priority of an identical channel from occurring between different management regions. Hence, it is possible for user equipment belonging to a wireless system of a transfer destination or lease destination to make high-priority access to an identical channel across a plurality of management regions.

Here, the network manager 100A may transfer or lease the high-priority access right only in the case where a predetermined condition is satisfied. For example, the network manager 100A may transfer or lease the high-priority access right in a range where the number of high-priority access rights held by the network manager 100B does not exceed the upper limit value. Accordingly, it is possible to comply with laws and regulations, for example. In the case of the 3.5 GHz band in the United States, for example, it is regulated by law that PALs for four channels shall be the upper limit value of the number of PALs held per license area.

The network manager 100A (for example, the report unit 134) reports information related to a frequency band utilized by the base station 200B to the frequency management server 300. Accordingly, it is possible for the frequency management server 300 to grasp information related to the high-priority access right transferred or leased from the network manager 100A to the network manager 100B. Hence, it is possible for the frequency management server 300 to appropriately allocate a frequency to each wireless network considering transfer or lease of the high-priority access right. The reported information may include, for example, information (for example, ID, management region, utilization condition, and the like) related to the network manager 100B of the transfer destination or lease destination, and information indicating compensation.

(Flow of Processing)

Hereinafter, a flow of processing related to transfer or lease of a high-priority access right will be described with reference to FIG. 11.

Figure 11:
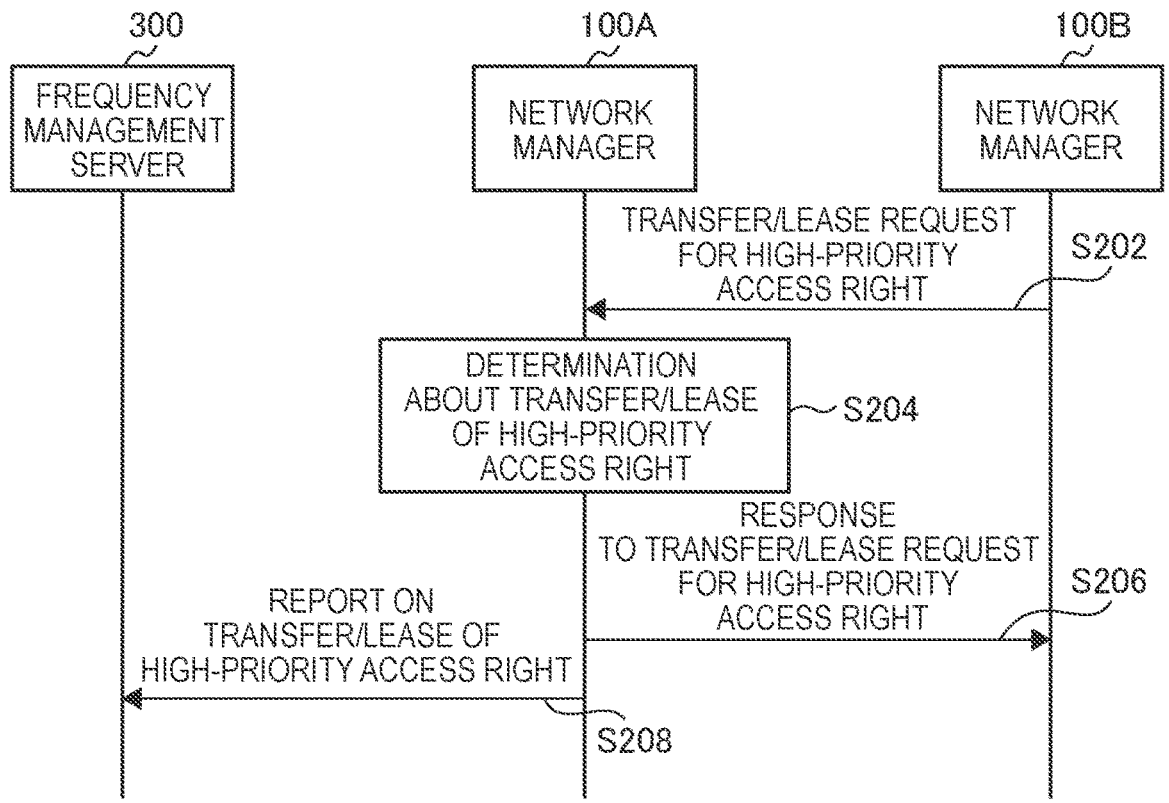
FIG. 11 is a sequence diagram illustrating an example of a flow of processing of transferring or leasing a high-priority access right executed in a system according to a second embodiment.

FIG. 11 is a sequence diagram illustrating an example of a flow of processing of transferring or leasing a high-priority access right executed in the system 1 according to the present embodiment. As shown in FIG. 11, first, the network manager 100B transmits a transfer/lease request of a high-priority access right to the network manager 100A (step S202). Next, the network manager 100A makes a determination about transfer/lease of the high-priority access right (step S204). For example, the network manager 100A determines whether or not to transfer/lease the high-priority access right on the basis of a frequency band whose utilization efficiency by the base station 200A is low or which is not utilized for primary cell application, channel priority information, the number of high-priority access rights held by the network manager 100B, or the like. Next, the network manager 100A transmits a response to the transfer/lease request of the high-priority access right to the network manager 100B (step S206). This response includes information indicating whether or not to transfer/lease the high-priority access right and in the case of performing transfer/lease, information related to the target high-priority access right. Then, in the case of transferring/leasing the high-priority access right, the network manager 100A transmits a report on transfer/lease of the high-priority access right to the frequency management server 300 (step S208).

Application Example

According to the present embodiment, it is possible for the network manager 100A to transfer or lease a high-priority access right less necessary for a subordinate wireless network to the network manager 100B. Accordingly, the high-priority access right can be effectively utilized between a plurality of business operators, for example.

3.3. Third Embodiment

The present embodiment is an embodiment of performing secondary utilization of a frequency band in which high-priority access is being carried out between different wireless networks.

Here, in the present embodiment, the network manager 100A and the frequency management server 300 shall be formed physically in an integral manner. In addition, in the present embodiment, an embodiment in which the network manager 100B not having the frequency management server 300 makes access to the network manager 100A shall be assumed.

(Technological Characteristics)

As a first example, the network manager 100A may permit the base station 200B to secondarily utilize a frequency on the basis of a request from the network manager 100B. Information related to frequency sharing exchanged between the network manager 100A and the network manager 100B in that case will be described.

The information related to frequency sharing may include a request from the network manager 100B to the network manager 100A for causing the base station 200B to utilize a frequency band in which high-priority access can be made, and a corresponding response. This request is also referred to as a first frequency secondary utilization request, and a response corresponding to the first frequency secondary utilization request is also referred to as a first frequency secondary utilization response. The first frequency secondary utilization request may include information indicating the management region of the network manager 100B, information indicating the geographical position of the base station 200B, and installation information indicating whether the base station 200B is installed indoors or outdoors. In addition, the first frequency secondary utilization response may include information indicating permission or non-permission of the first frequency secondary utilization response. In addition, in the case of permission, the first frequency secondary utilization response may include channel information related to the permitted frequency band, utilization condition, utilization region, maximum transmission power, and information indicating a validity period.

As a second example, the network manager 100A may request frequency secondary utilization to the network manager 100B. Information related to frequency sharing exchanged between the network manager 100A and the network manager 100B in that case will be described.

The information related to frequency sharing may include a request from the network manager 100A to the network manager 100B for causing the base station 200B to utilize a frequency band in which high-priority access can be made, and a corresponding response. This request is also referred to as a second frequency secondary utilization request, and a response corresponding to the second frequency secondary utilization request is also referred to as a second frequency secondary utilization response. The second frequency secondary utilization request may include information similar to the above-described first frequency secondary utilization response.

The network manager 100A (for example, the negotiation unit 132) determines carrying out/not carrying out secondary utilization. For example, in the second example, in the case where, if the base station 200B is utilized, it is possible to ensure network coverage which is difficult to ensure with the base station 200A, the network manager 100A determines carrying out secondary utilization, and transmits the second frequency secondary utilization request. However, the network manager 100A may determine carrying out secondary utilization in the case where a target second wireless system is installed indoors, and may determine not carrying out secondary utilization in the case where the target second wireless system is installed outdoors. This is because, in the case where the base station 200B installed outdoors secondarily utilizes a frequency, the probability that interference with the base station 200A occurs is high. Similarly with regard to the first example, the network manager 100A determines carrying out/not carrying out secondary utilization.

In addition, in either of the first example and the second example, the network manager 100A (for example, the report unit 134) reports information related to a frequency band secondarily utilized by the base station 200B to the frequency management server 300. Accordingly, it is possible for the frequency management server 300 to grasp information related to the frequency band secondarily utilized by the base station 200B. Hence, it is possible for the frequency management server 300 to appropriately allocate a frequency to each wireless network considering secondary utilization of the frequency band. The reported information may include information (for example, ID, geographical position information) related to the base station 200B performing secondary utilization, channel utilization information, and the like, for example.

(Flow of Processing)

Hereinafter, a flow of processing related to secondary utilization of a frequency band in which high-priority access is being made will be described with reference to FIG. 12 and FIG. 13. Note that FIG. 12 illustrates a flow of processing related to the first example, and FIG. 12 illustrates a flow of processing related to the second example.

Figure 12:
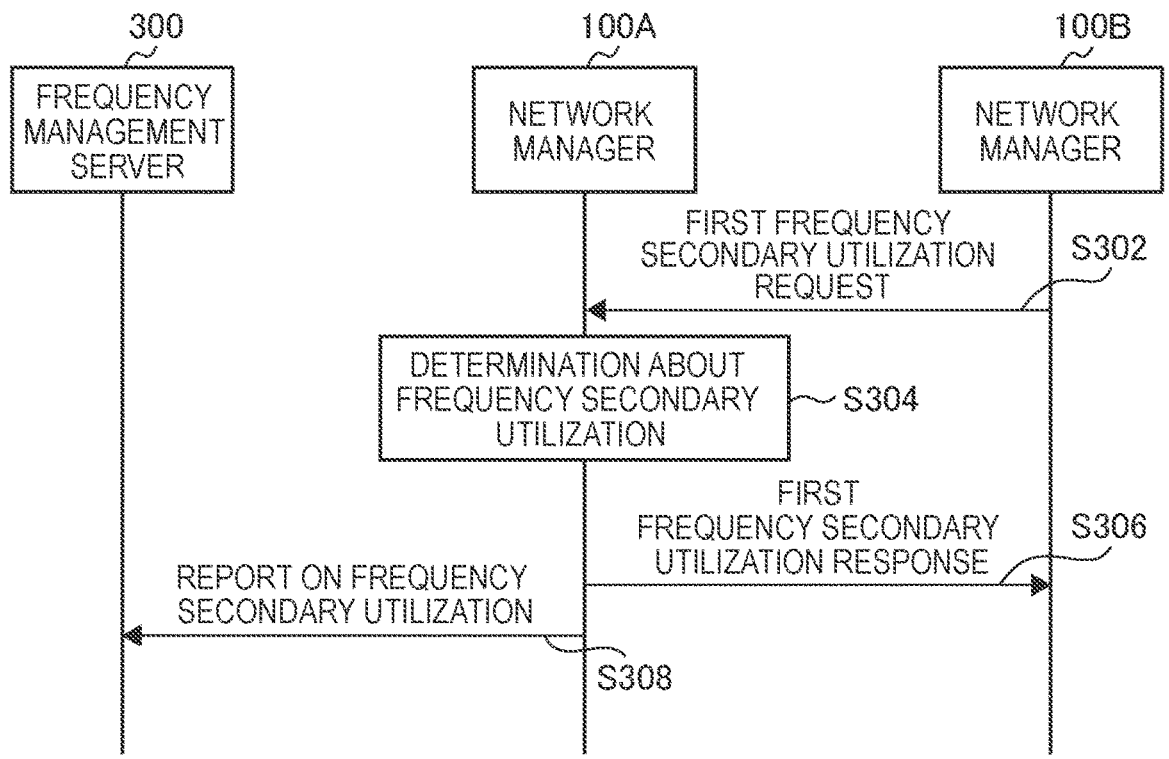
FIG. 12 is a sequence diagram illustrating an example of a flow of processing of secondary utilization of a frequency band in which high-priority access is being made, executed in a system according to a third embodiment.

FIG. 12 is a sequence diagram illustrating an example of a flow of processing of secondary utilization of a frequency band in which high-priority access is being made that is executed in the system 1 according to the present embodiment. As shown in FIG. 12, first, the network manager 100B transmits the first frequency secondary utilization request to the network manager 100A (step S302). Next, the network manager 100A makes a determination about frequency secondary utilization on the basis of the first frequency secondary utilization request (step S304). For example, the network manager 100A determines whether or not to permit frequency secondary utilization, and in the case of permission, determines a frequency band to be secondarily utilized. Next, the network manager 100A transmits the first frequency secondary utilization response including information indicating a determination result in step S304 to the network manager 100B (step S306). Then, in the case where frequency secondary utilization is to be permitted, the network manager 100A transmits a report on frequency secondary utilization to the frequency management server 300 (step S308).

Figure 13:
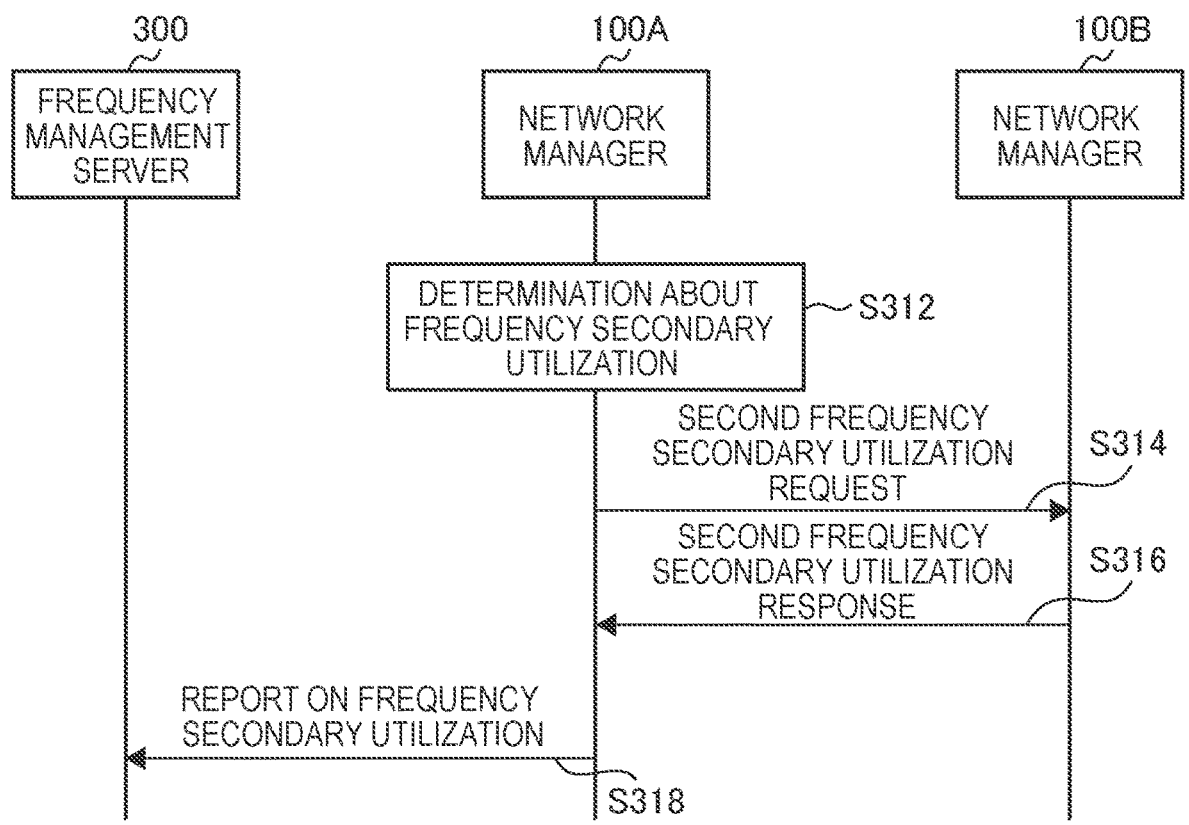
FIG. 13 is a sequence diagram illustrating an example of a flow of processing of secondary utilization of a frequency band in which high-priority access is being made, executed in a system according to the third embodiment.

FIG. 13 is a sequence diagram illustrating an example of a flow of processing of secondary utilization of a frequency band in which high-priority access is being made that is executed in the system 1 according to the present embodiment. As shown in FIG. 13, first, the network manager 100A makes a determination about frequency secondary utilization (step S312). For example, in the case where the base station 200B installed indoors in a specific geographical region where it is difficult to ensure network coverage with the subordinate base station 200A exists, the network manager 100A determines causing the base station 200B to perform frequency secondary utilization. Next, the network manager 100A transmits the second frequency secondary utilization request to the network manager 100B that manages the base station 200B to be caused to carry out frequency secondary utilization (step S314). Next, the network manager 100B determines the propriety of carrying out frequency secondary utilization, and transmits the second frequency secondary utilization response including information indicating a determination result to the network manager 100A (step S316). Then, in the case where the base station 200B carries out frequency secondary utilization, the network manager 100A transmits the report on frequency secondary utilization to the frequency management server 300 (step S318).

Application Example

For example, in a specific geographical region, the case where network coverage can be ensured if the base station 200B is included although network coverage cannot be ensured only with the base station 200A is assumed. In such a case, as described with regard to the second example, it is possible for the network manager 100A to ensure network coverage by transmitting the second frequency secondary utilization request to the network manager 100B. Hence, it is possible for the network manager 100A to provide subordinate user equipment with network coverage in an identical frequency band. Hence, it is possible for the user equipment to avoid burdensome processing of measurement in different frequency bands (Inter-frequency measurement). Note that the user equipment may perform processing so as to avoid roaming at a handover from the base station 200A to the base station 200B. In addition, interference due to outdoor secondary utilization is prevented by experiencing the determination based on outdoor/indoor. Such an application example is as the scenario described above with reference to FIG. 4 and FIG. 5.

The same applies to the first example. That is, it is possible for the network manager 100B to ensure network coverage by transmitting the first frequency secondary utilization request to the network manager 100A.

3.4. Fourth Embodiment

The present embodiment is an embodiment of performing carrier aggregation including frequency sharing between wireless systems belonging to different network managers 100.
(Technological Characteristics)

The base station 200 (for example, the communication control unit 251) according to the present embodiment performs carrier aggregation using a frequency band that the base station 200 itself provides and a frequency band provided by frequency sharing by the base station 200 managed by another network manager 100. Note that either frequency band may be used as a primary cell.

Therefore, the base station 200 (for example, the negotiation unit 253) transmits a message requesting processing for carrying out carrier aggregation including the above-described frequency sharing to the network manager 100 that manages the base station 200 itself. The message is a message requesting exchange of information for carrying out carrier aggregation through use of a frequency band provided by frequency sharing by another base station 200, the information being related to frequency sharing between the network manager 100 that manages the base station 200 itself and another network manager 100 that manages the other base station 200. Then, the network manager 100 (for example, the information exchange unit 133) exchanges information related to frequency sharing with the other network manager 100 for carrying out carrier aggregation including the above-described frequency sharing. Hereinafter, information related to frequency sharing exchanged in the present embodiment will be described. Note that, hereinafter, for the sake of description, the base station 200 that transmits the above-described message is referred to as the base station 200A, and the base station 200 to which the above-described message is transmitted is referred to as the base station 200B. As a matter of course, this relation may be inversed.

For example, the information related to frequency sharing includes information related to carrier aggregation of a frequency band that the base station 200A provides and a frequency band that the base station 200B provides by frequency sharing. In detail, the information related to frequency sharing includes a message requesting the base station 200B to make the frequency band for carrier aggregation available by frequency sharing. Accordingly, it is possible to carry out carrier aggregation through use of the frequency band provided by the base station 200A and the frequency band provided by frequency sharing by the base station 200B.

Specifically, the network manager 100A (for example, the negotiation unit 132) requests the base station 200B by way of the network manager 100B to set a channel, which is different from a channel that the base station 200A is utilizing, as a component carrier.

For example, in the case where the base station 200A is making high-priority access, a channel to which the base station 200A is making high-priority access may be set as primary, and a channel for which the base station 200B is caused to perform frequency sharing may be set as secondary. Therefore, the network manager 100A may transfer or lease the high-priority access right to the network manager 100B. Note that the channel to be set as secondary may have any priority.

On the other hand, in the case where the base station 200A is not making high-priority access, a channel to which the base station 200A is making low-priority access may be set as secondary, and a channel to which the base station 200B is caused to make high-priority access may be set as primary. Therefore, the network manager 100A may transfer or lease the high-priority access right to the network manager 100B. In addition, the network manager 100A or 100B may perform processing such that roaming due to a handover across the network manager 100 does not occur.

The information for frequency sharing exchanged between the network managers 100 for carrier aggregation including the above-described frequency sharing has been described above.

The network manager 100A (for example, the finding unit 135) finds the network manager 100B having the base station 200B existing around the base station 200A as a management target before exchanging information for frequency sharing. For example, the network manager 100A may find the network manager 100B by referring to a measurement result obtained by the base station 200A. In addition, the network manager 100A may find the network manager 100B by referring to information that the network manager 100A itself stores.
(Flow of Processing)

Hereinafter, a flow of processing related to carrier aggregation including frequency sharing will be described with reference to FIG. 14.

Figure 14:
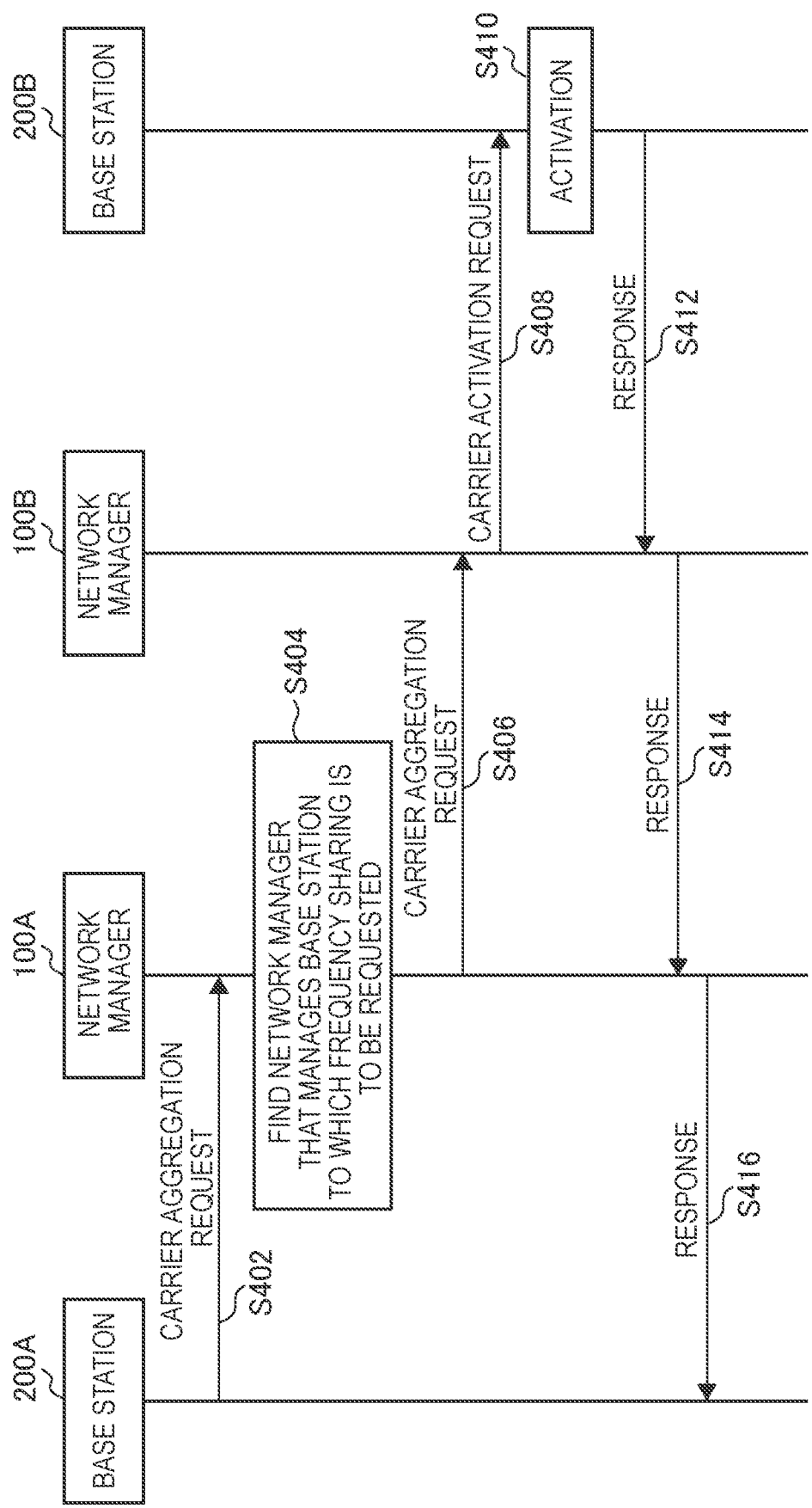
FIG. 14 is a sequence diagram illustrating an example of a flow of carrier aggregation processing including frequency sharing executed in a system according to a fourth embodiment.

FIG. 14 is a sequence diagram illustrating an example of a flow of processing of carrier aggregation including frequency sharing executed in the system 1 according to the present embodiment. As shown in FIG. 14, first, the base station 200A transmits a carrier aggregation request to the network manager 100A (step S402). The carrier aggregation request herein is a message requesting information exchange between the network manager 100A and the network manager 100B for carrying out carrier aggregation through use of a frequency band provided by frequency sharing by the base station 200B. Next, the network manager 100A finds the network manager 100 that manages the base station 200 to which frequency sharing is to be requested (step S404). For example, the network manager 100A finds the base station 200B that manages the base station 200B existing around the base station 200A. Next, the network manager 100A transmits the carrier aggregation request to the found network manager 100B (step S406). The carrier aggregation request herein is a message requesting the base station 200B to make the frequency band for carrier aggregation available by frequency sharing. Next, the network manager 100B transmits a carrier activation request to the base station 200B in accordance with the received carrier aggregation request (step S408). The carrier activation request herein is a message requesting activation of a component carrier utilized for carrier aggregation. Then, the base station 200B activates the designated component carrier in accordance with the received carrier activation request (step S410). Thereafter, the base station 200B transmits a response indicating an activation result to the base station 200A by way of the network manager 100B and the network manager 100A (steps S412, S414, and S416). Accordingly, the process ends.

Application Example

According to the present embodiment, carrier aggregation between different business operators is made possible. In addition, even in an identical business operator, carrier aggregation between subordinate base stations 200 of different network managers 100 is made possible. This is effective in the case where an available channel varies among management regions.

4. APPLICATION EXAMPLES

The technology of the present disclosure can be applied to various products. For example, the network manager 100 may be realized as a server of any type such as a tower server, a rack server, a blade server, or the like. In addition, at least some of these constituent elements of the network manager 100 may be implemented by a module mounted in a server (e.g., an integrated circuit module configured in one die or a card or a blade inserted into a slot of a blade server).

Further, the base station 200 may be realized as any type of evolved node B (eNB), for example, a macro eNB, a small eNB, or the like. A small eNB may be an eNB that covers a smaller cell than a macro cell, such as a pico eNB, a micro eNB, or a home (femto) eNB. Alternatively, the base station 200 may be realized as another type of base station such as a node B or a base transceiver station (BTS). The base station 200 may include a main body that controls radio communication (also referred to as a base station device) and one or more remote radio heads (RRHs) disposed in a different place from the main body. In addition, various types of terminals to be described below may operate as the base station 200 by temporarily or semi-permanently executing the base station function. Further, at least some of constituent elements of the base station 200 may be implemented by the base station device or a module for the base station device.

4.1. Application Example with Regard to Network Manager

Figure 15:
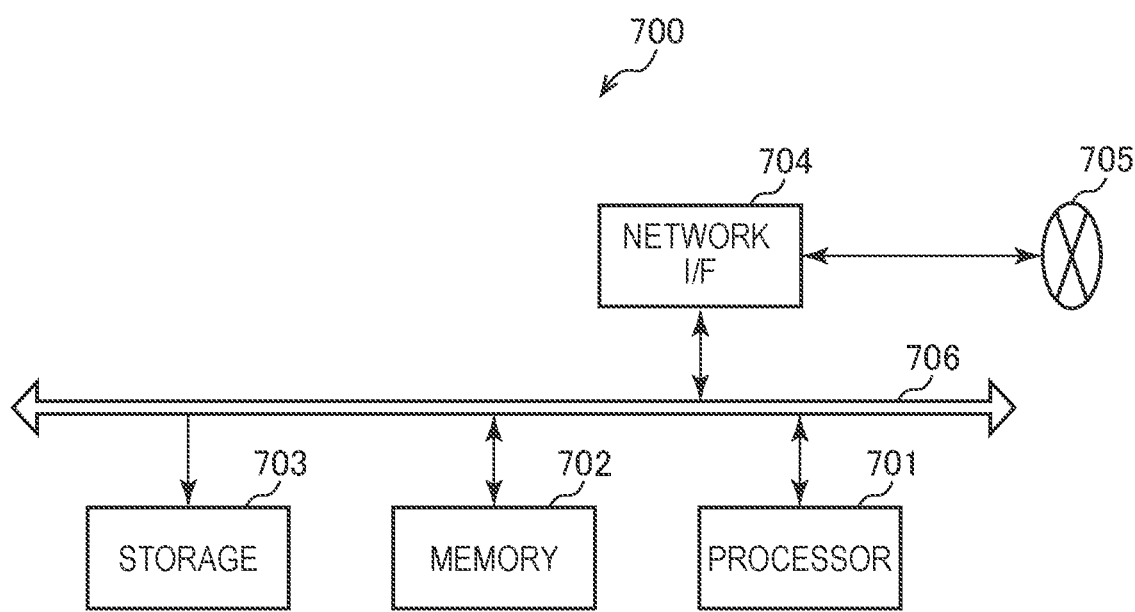
FIG. 15 is a block diagram illustrating an example of a schematic configuration of a server.

FIG. 15 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP) and controls various functions of the server 700. The memory 702 includes a random access memory (RAM) and a read only memory (ROM) and stores programs executed by the processor 701 and data. The storage 703 can include a storage medium such as a semiconductor memory or a hard disk.

The network interface 704 is a wired communication interface for connecting the server 700 to a wired communication network 705. The wired communication network 705 may be a core network such as an evolved packet core (EPC) or a packet data network (PDN) such as the Internet.

The bus 706 connects the processor 701, the memory 702, the storage 703, and the network interface 704 to each other. The bus 706 may include two or more buses that operate at different speeds (e.g., a high-speed bus and a low-speed bus).

In the server 700 illustrated in FIG. 15, one or more constituent elements (the management unit 131, the negotiation unit 132, the information exchange unit 133, the report unit 134, and/or the finding unit 135) included in the network manager 100 described with reference to FIG. 7 may be implemented by the processor 701. As an example, a program for causing a processor to function as the one or more constituent elements (i.e., a program for causing a processor to execute operations of the one or more constituent elements) may be installed in the server 700 and the processor 701 may execute the program. As another example, a module including the processor 701 and the memory 702 may be mounted in the server 700 and the one or more constituent elements may be implemented by the module. In this case, the module may store a program for causing a processor to function as the one or more constituent elements in the memory 702 and the program may be executed by the processor 701. The server 700 or the module may be provided as devices having the one or more constituent elements as described above, or the program for causing a processor to function as the one or more constituent elements may be provided. In addition, a readable recording medium in which the program is recorded may be provided.

In addition, in the server 700 shown in FIG. 15, the network communication unit 110 described, for example, with reference to FIG. 7 may be implemented by the network interface 704. Moreover, the storage unit 120 may be implemented by the memory 702 and/or the storage 703.

4.2. Application Example with Regard to Base Station

First Application Example

Figure 16:
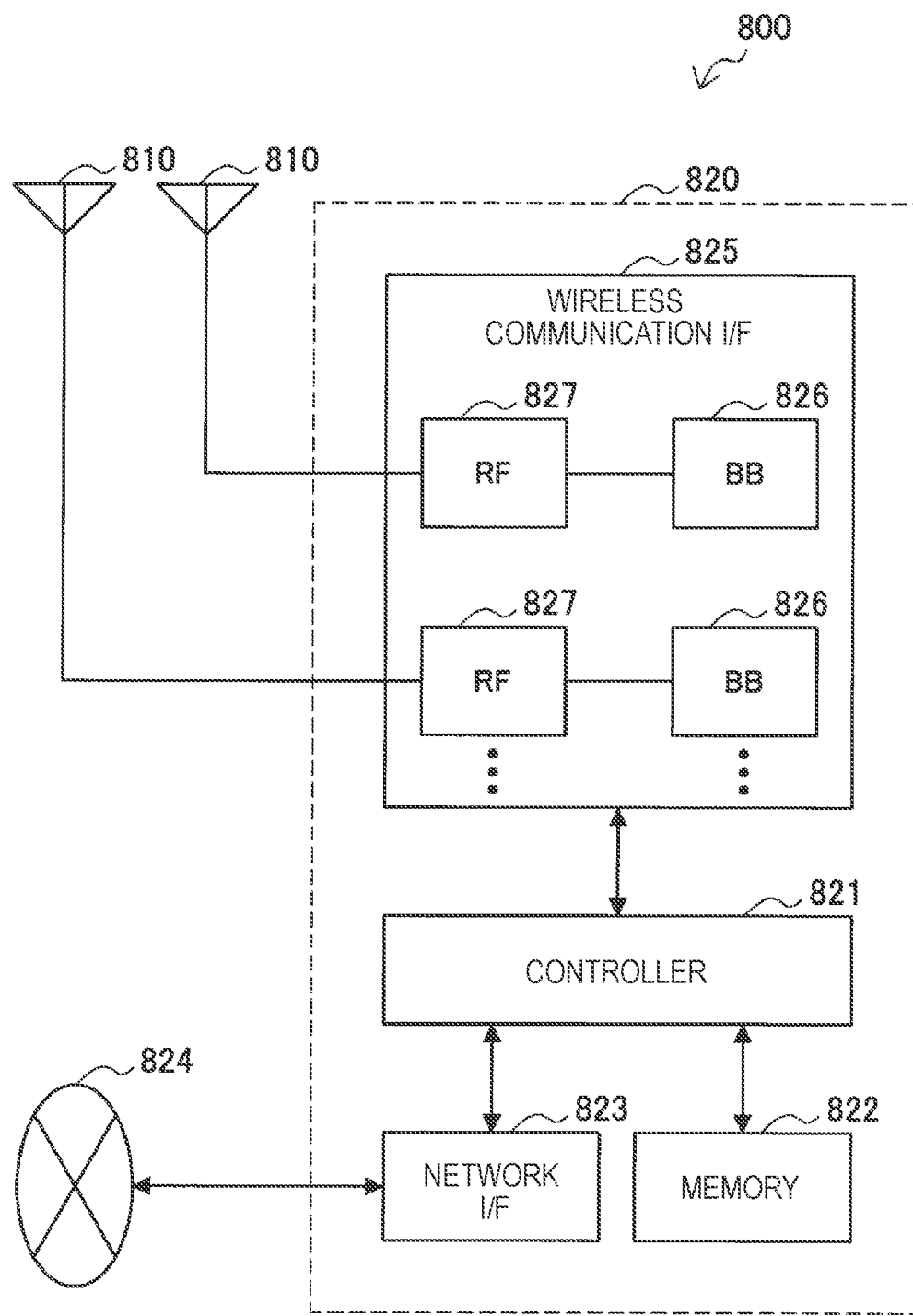
FIG. 16 is a block diagram illustrating a first example of a schematic configuration of an eNB.

FIG. 16 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 16. For example, the multiple antennas 810 may be compatible with multiple frequency bands used by the eNB 800. Although FIG. 16 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In this case, the eNB 800 may be connected to a core network node or another eNB through a logical interface (e.g. S1 interface or X2 interface). The network interface 823 may also be a wired communication interface or a wireless communication interface for wireless backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 16. For example, the multiple BB processors 826 may be compatible with multiple frequency bands used by the eNB 800. The wireless communication interface 825 may include the multiple RF circuits 827, as illustrated in FIG. 16. For example, the multiple RF circuits 827 may be compatible with multiple antenna elements. Although FIG. 16 illustrates the example in which the wireless communication interface 825 includes the multiple BB processors 826 and the multiple RF circuits 827, the wireless communication interface 825 may also include a single BB processor 826 or a single RF circuit 827.

In the eNB 800 shown in FIG. 16, one or more constituent elements (the communication control unit 251 and/or the negotiation unit 253) included in the base station 200 described with reference to FIG. 8 may be implemented by the wireless communication interface 825. Alternatively, at least some of these constituent elements may be implemented by the controller 821. As an example, a module which includes a part (for example, the BB processor 826) or all of the wireless communication interface 825 and/or the controller 821 may be mounted in the eNB 800, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the eNB 800, and the wireless communication interface 825 (for example, the BB processor 826) and/or the controller 821 may execute the program. As described above, the eNB 800, the base station device 820 or the module may be provided as a device which includes the one or more constituent elements, and the program for causing the processor to function as the one or more constituent elements may be provided. In addition, a readable recording medium in which the program is recorded may be provided.

In addition, in the eNB 800 shown in FIG. 16, the wireless communication unit 220 described with reference to FIG. 8 may be implemented by the wireless communication interface 825 (for example, the RF circuit 827). Moreover, the antenna unit 210 may be implemented by the antenna 810. Moreover, the network communication unit 230 may be implemented by the controller 821 and/or the network interface 823. Further, the storage unit 240 may be implemented by the memory 822.

Second Application Example

Figure 17:
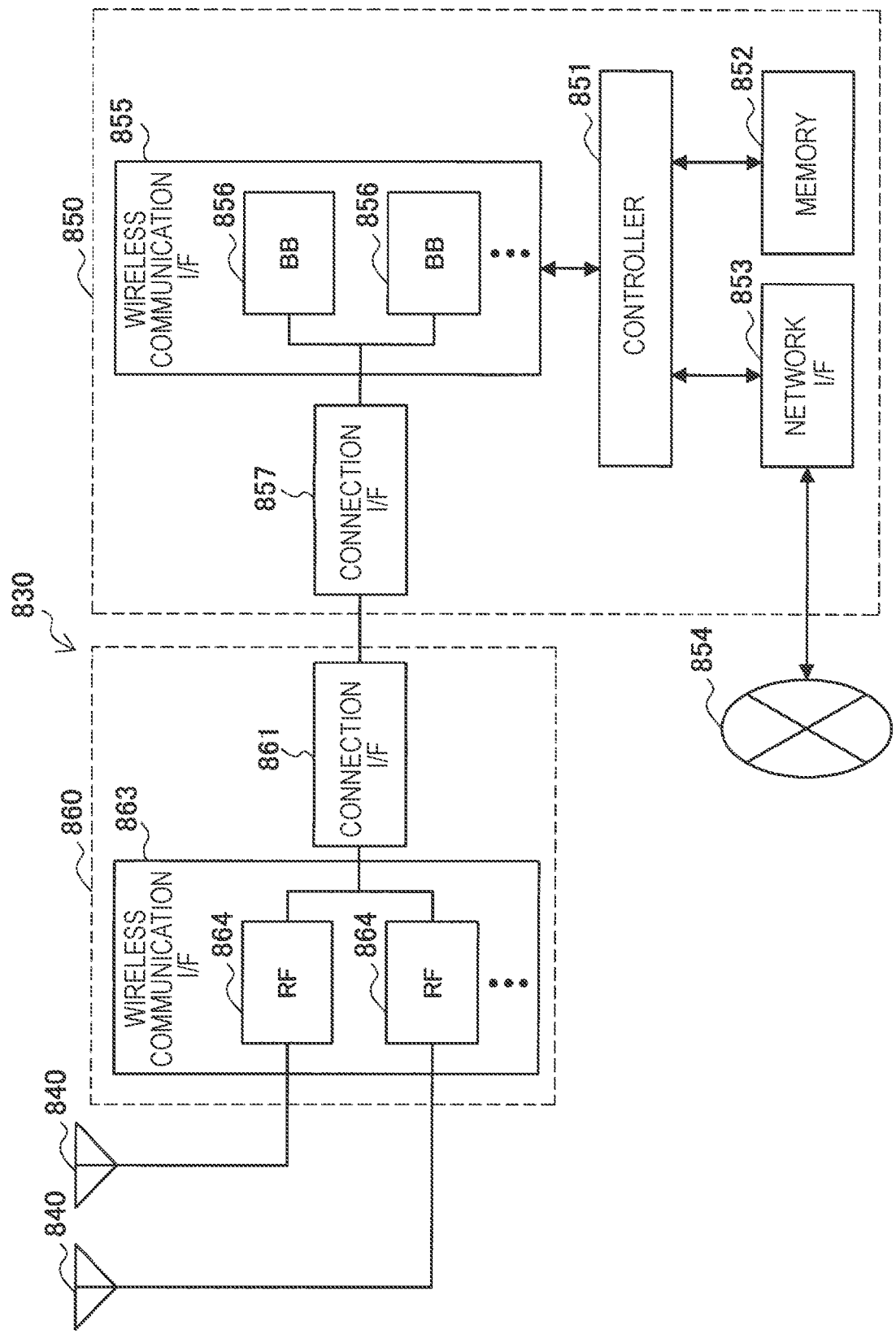
FIG. 17 is a block diagram illustrating a second example of the schematic configuration of the eNB.

FIG. 17 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 17. For example, the multiple antennas 840 may be compatible with multiple frequency bands used by the eNB 830. Although FIG. 17 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 16.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 16, except the BB processor 856 is connected to the RF circuit 864 of the RRH 860 via the connection interface 857. The wireless communication interface 855 may include the multiple BB processors 856, as illustrated in FIG. 17. For example, the multiple BB processors 856 may be compatible with multiple frequency bands used by the eNB 830. Although FIG. 17 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 17. For example, the multiple RF circuits 864 may support multiple antenna elements. Although FIG. 17 illustrates the example in which the wireless communication interface 863 includes the multiple RF circuits 864, the wireless communication interface 863 may also include a single RF circuit 864.

In the eNB 830 shown in FIG. 17, one or more constituent elements (the communication control unit 251 and/or the negotiation unit 253) described with reference to FIG. 8 included in the base station 200 may be implemented by the wireless communication interface 855 and/or the wireless communication interface 863. Alternatively, at least some of these constituent elements may be implemented by the controller 851. As an example, a module which includes a part (for example, the BB processor 856) or all of the controller wireless communication interface 855 and/or the controller 851 may be mounted in the eNB 830, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the eNB 830, and the wireless communication interface 855 and/or the controller 851 may execute the program. As described above, the eNB 830, the base station device 850 or the module may be provided as a device which includes the one or more constituent elements, and the program for causing the processor to function as the one or more constituent elements may be provided. In addition, a readable recording medium in which the program is recorded may be provided.

In addition, in the eNB 830 shown in FIG. 17, the wireless communication unit 220 described, for example, with reference to FIG. 8 may be implemented by the wireless communication interface 863 (for example, the RF circuit 864). Moreover, the antenna unit 210 may be implemented by the antenna 840. Moreover, the network communication unit 230 may be implemented by the controller 851 and/or the network interface 853. Further, the storage unit 240 may be implemented by the memory 852.

5. CONCLUSION

One embodiment of the present disclosure has been described above in detail with reference to FIG. 1 to FIG. 17. As described above, the network manager 100A according to the present embodiment manages one or more base stations 200A, and exchanges information related to frequency sharing by the base station 200B with the network manager 100B that manages one or more base stations 200B, and this information related to frequency sharing includes information related to a frequency band in which high-priority access can be made. Such a configuration allows the network manager 100A and the network manager 100B to exchange information for sharing a high-priority frequency allocated to the base station 200 that each of the network manager 100A and the network manager 100B manages, so that more efficient utilization of the frequency resource is achieved.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

The processing described herein with reference to the flowcharts and the sequence diagrams does not necessarily have to be executed in the illustrated order. Some processing steps may be executed in parallel. In addition, additional processing steps may also be adopted, while some of the processing steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication control device including:

a management unit configured to manage one or more first wireless communication devices; and an information exchange unit configured to exchange, with another communication control device that manages one or more second wireless communication devices, information related to frequency sharing by the second wireless communication devices, in which the information related to frequency sharing includes information related to a frequency band in which high-priority access can be made.

(2)

The communication control device according to (1), in which the information related to frequency sharing includes information for utilizing the frequency band in which high-priority access can be made.

(3)

The communication control device according to (1) or (2), in which the information related to frequency sharing is associated with a geographical range.

(4)

The communication control device according to any one of (1) to (3), in which the information related to frequency sharing includes information related to a right for high-priority access.

(5)

The communication control device according to (4), in which the information related to frequency sharing includes information related to a frequency band for which the right has been acquired.

(6)

The communication control device according to (4) or (5), in which the information related to frequency sharing includes information related to a frequency band for which the right is being exercised.

(7)

The communication control device according to any one of (1) to (6), in which the other communication control device is operated by a business operator different from the communication control device.

(8)

The communication control device according to any one of (1) to (7), further including:

a finding unit configured to find the other communication control device that manages the second wireless communication device existing around the first wireless communication device.

(9)

The communication control device according to (8), in which the information related to frequency sharing includes information related to carrier aggregation of a frequency band that the first wireless communication device provides and a frequency band that the second wireless communication device provides by frequency sharing.

(10)

The communication control device according to (9), in which the information related to frequency sharing includes a message requesting the second wireless communication device to make the frequency band for carrier aggregation available by frequency sharing.

(11)

The communication control device according to any one of (1) to (10), further including:

a negotiation unit configured to acquire a right for high-priority access from a frequency management device, in which a frequency band for which the right for high-priority access acquired by the negotiation unit is exercised is utilized by the second wireless communication device.

(12)

The communication control device according to (11), in which the frequency band utilized by the second wireless communication device is a frequency band whose rate of utilization by the first wireless communication device is low.

(13)

The communication control device according to (11) or (12), in which the frequency band utilized by the second wireless communication device is a frequency band not utilized as a primary cell of carrier aggregation by the first wireless communication device.

(14)

The communication control device according to any one of (1) to (13), in which the information related to frequency sharing includes a request from the other communication control device to the communication control device for causing the second wireless communication device to utilize a frequency band in which high-priority access can be made.

(15)

The communication control device according to (14), in which the information related to frequency sharing includes information indicating a geographical position of the second wireless communication device.

(16)

The communication control device according to (14) or (15), in which the information related to frequency sharing includes information indicating whether the second wireless communication device is installed indoors or outdoors.

(17)

The communication control device according to any one of (1) to (16), in which the information related to frequency sharing includes a request from the communication control device to the other communication control device for causing the second wireless communication device to utilize a frequency band in which high-priority access can be made.

(18)

A communication control method including:

managing one or more first wireless communication devices by a processor; and with another communication control device that manages one or more second wireless communication devices, exchanging, by an information exchange unit, information related to frequency sharing by the second wireless communication devices, in which the information related to frequency sharing includes information related to a frequency band in which high-priority access can be made.

(19)

A program for causing a computer to function as a communication control device including:
a management unit configured to manage one or more first wireless communication devices; and
an information exchange unit configured to exchange, with another communication control device that manages one or more second wireless communication devices, information related to frequency sharing by the second wireless communication devices, in which
the information related to frequency sharing includes information related to a frequency band in which high-priority access can be made.

(20)

A wireless communication device including:
a processing unit configured to transmit a message requesting exchange of information for carrying out carrier aggregation through use of a frequency band provided by frequency sharing by another wireless communication device to a communication control device that manages the wireless communication device, the information being related to the frequency sharing between the communication control device and another communication control device that manages the other wireless communication device.

REFERENCE SIGNS LIST 1 system
10 spectrum broker
20 eNB
30 SAS database
40 core network
100 network manager
110 network communication unit
120 storage unit
130 processing unit
131 management unit
132 negotiation unit
133 information exchange unit
134 report unit
135 finding unit
200 base station
210 antenna unit
220 wireless communication unit
230 network communication unit
240 storage unit
250 processing unit
251 communication control unit
253 negotiation unit
300 frequency management server

The invention claimed is:

1. A first communication control device, comprising:
circuitry configured to:
control at least one first wireless communication device;
acquire, from a frequency management device, a right for a high-priority access of at least one frequency band of a spectrum;
transmit first information to a second communication control device, wherein
the frequency management device is different from each of the first communication control device and the second communication control device,
the at least one frequency band of the spectrum is assigned to the at least one first wireless communication device and at least one second wireless communication device,
the at least one second wireless communication device is controllable by the second communication control device,
the at least one frequency band is available for the high-priority access,
the first information includes second information, and
the second information corresponds to the at least one frequency band available for the high-priority access;
receive, from the second communication control device, third information indicating a location of installation of the at least one second wireless communication device, wherein the location of installation corresponds to one of an indoor location or an outdoor location;
permit the high-priority access for the at least one second wireless communication device in a case where the third information indicates the location of installation of the at least one second wireless communication device is the indoor location; and
restrict the high-priority access for the at least one second wireless communication device in a case where the third information indicates the location of installation of the at least one second wireless communication device is the outdoor location.

2. The first communication control device according to claim 1, wherein the third information further indicates a geographical range of the at least one second wireless communication device.

3. The first communication control device according to claim 1, wherein the first information further includes fourth information that corresponds to the right for the high-priority access.

4. The first communication control device according to claim 3, wherein the right for the high-priority access is of a specific frequency band of the spectrum.

5. The first communication control device according to claim 3, wherein the first information further includes fifth information that corresponds to a first frequency band of the at least one frequency band.

6. The first communication control device according to claim 1, wherein a business operator of the second communication control device is different from a business operator of the first communication control device.

7. The first communication control device according to claim 1, wherein
the circuitry is further configured to detect the second communication control device, and
the at least one second wireless communication device exists within a specific distance of the at least one first wireless communication device.

8. The first communication control device according to claim 7, wherein
the first information further includes fourth information that corresponds to carrier aggregation of a first frequency band of the spectrum and a second frequency band of the spectrum,
the first frequency band is of the at least one first wireless communication device, and
the second frequency band is of the at least one second wireless communication device.

9. The first communication control device according to claim 8, wherein
the first information further includes a message that requests the at least one second wireless communication device to provide the second frequency band for the carrier aggregation, and the second frequency band is provided based on a frequency sharing process.

10. The first communication control device according to claim 1, wherein the at least one frequency band is utilizable by the at least one second wireless communication device.

11. The first communication control device according to claim 10, wherein the at least one frequency band is utilizable by the at least one first wireless communication device, and a rate of utilization of the at least one frequency band is smaller than a threshold rate.

12. The first communication control device according to claim 10, wherein a second frequency band is utilizable, by the at least one first wireless communication device, as a primary cell of carrier aggregation, and the at least one frequency band is different from the second frequency band.

13. The first communication control device according to claim 1, wherein the circuitry is further configured to receive a request from the second communication control device, the request corresponds to utilization of a first frequency band of the at least one frequency band, the first frequency band is utilizable by the at least one second wireless communication device for the high-priority access, and the utilization of the first frequency band is based on the request.

14. The first communication control device according to claim 13, wherein the circuitry is further configured to receive geographical position information of the at least one second wireless communication device from the second communication control device.

15. The first communication control device according to claim 1, wherein the first information further includes a request from the first communication control device to the second communication control device, the request corresponds to utilization of a first frequency band of the at least one frequency band, the first frequency band is utilizable by the at least one second wireless communication device for the high-priority access, and the utilization of the first frequency band is based on the request.

16. The first communication control device according to claim 1, wherein the circuitry is further configured to transfer the right for the high-priority access to the second communication control device in a case where a number of high-priority access rights held by the second communication control device does not exceed an upper limit value.

17. A communication control method, comprising:

in a first communication control device:

controlling at least one first wireless communication device;

acquiring, from a frequency management device, a right for a high-priority access of at least one frequency band of a spectrum;

transmitting first information to a second communication control device, wherein the frequency management device is different from each of the first communication control device and the second communication control device, the at least one frequency band of the spectrum is assigned to the at least one first wireless communication device and at least one second wireless communication device, the at least one second wireless communication device is controllable by the second communication control device, the at least one frequency band is available for the high-priority access, the first information includes second information, and the second information corresponds to the at least one frequency band available for the high-priority access;

receiving, from the second communication control device, third information indicating a location of installation of the at least one second wireless communication device, wherein the location of installation corresponds to one of an indoor location or an outdoor location;

permitting the high-priority access for the at least one second wireless communication device in a case where the third information indicates the location of installation of the at least one second wireless communication device is the indoor location; and restricting the high-priority access for the at least one second wireless communication device in a case where the third information indicates the location of installation of the at least one second wireless communication device is the outdoor location.

18. A non-transitory computer-readable medium having stored thereon computer-executable instructions, which when executed by a processor of a first communication control device, cause the processor to execute operations, the operations comprising:

controlling at least one first wireless communication device;

acquiring, from a frequency management device, a right for a high-priority access of at least one frequency band of a spectrum;

transmitting first information to a second communication control device, wherein the frequency management device is different from each of the first communication control device and the second communication control device, the at least one frequency band of the spectrum is assigned to the at least one first wireless communication device and at least one second wireless communication device, the at least one second wireless communication device is controllable by the second communication control device, the at least one frequency band is available for the high-priority access, the first information includes second information, and the second information corresponds to the at least one frequency band available for the high-priority access;

receiving, from the second communication control device, third information indicating a location of installation of the at least one second wireless communication device, wherein the location of installation corresponds to one of an indoor location or an outdoor location;

permitting the high-priority access for the at least one second wireless communication device in a case where the third information indicates the location of installation of the at least one second wireless communication device is the indoor location; and restricting the high-priority access for the at least one second wireless communication device in a case where the third information indicates the location of installation of the at least one second wireless communication device is the outdoor location.

19. A first wireless communication device, comprising: circuitry configured to:

transmit a first message to a first communication control device, wherein the transmitted first message includes a first request for transmission of information to a second communication control device, the information is related to a frequency band of a spectrum available for access, the spectrum is assigned to a communication service, the frequency band is utilizable by a second wireless communication device, the frequency band is shared between the first communication control device and the second communication control device, the information corresponds to the frequency band shared between the first communication control device and the second communication control device, the first communication control device receives the first message from the first wireless communication device and transmits the first message to the second communication control device, the second communication control device transmits a second message to the second wireless communication device based on the first message, the transmitted second message includes a second request for activation of a component carrier for carrier aggregation, and the second wireless communication device is controllable by the second communication control device;

receive a response from the second wireless communication device based on the second request, wherein the response indicates the activation of the component carrier;

utilize the spectrum assigned to the communication service; and utilize the frequency band for the carrier aggregation based on the activation of the component carrier.

* * * * *